(12) United States Patent
Kim et al.

(10) Patent No.: US 11,468,878 B2
(45) Date of Patent: Oct. 11, 2022

(54) SPEECH SYNTHESIS IN NOISY ENVIRONMENT

(71) Applicant: LG ELECTRONICS INC., Seoul (KR)

(72) Inventors: Minook Kim, Seoul (KR); Yongchul Park, Seoul (KR); Sungmin Han, Seoul (KR); Siyoung Yang, Seoul (KR); Sangki Kim, Seoul (KR); Juyeong Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/029,582

(22) Filed: Sep. 23, 2020

(65) Prior Publication Data

US 2021/0134262 A1    May 6, 2021

(30) Foreign Application Priority Data

Nov. 1, 2019   (KR) .......................... 10-2019-0138531

(51) Int. Cl.
| | | |
|---|---|---|
| *G10L 15/00* | (2013.01) | |
| *G10L 13/00* | (2006.01) | |
| *G10L 15/25* | (2013.01) | |
| *G10L 15/16* | (2006.01) | |
| *G10L 13/033* | (2013.01) | |
| *G10L 15/02* | (2006.01) | |
| *G10L 15/24* | (2013.01) | |
| *G10L 25/51* | (2013.01) | |
| *G10L 13/047* | (2013.01) | |

(52) U.S. Cl.
CPC .......... *G10L 13/033* (2013.01); *G10L 13/047* (2013.01); *G10L 15/02* (2013.01); *G10L 15/24* (2013.01); *G10L 25/51* (2013.01)

(58) Field of Classification Search
CPC ......... G10L 13/00; G10L 13/10; G10L 15/16; G10L 25/30; G10L 15/00
See application file for complete search history.

(56) References Cited

U.S. PATENT DOCUMENTS

| 8,571,871 | B1 * | 10/2013 | Stuttle | G10L 13/033 |
| | | | | 704/260 |
| 10,176,809 | B1 * | 1/2019 | Pierard | G10L 15/18 |
| 11,205,417 | B2 * | 12/2021 | Lee | G10L 25/18 |
| 2004/0049382 | A1 * | 3/2004 | Yamaura | G10L 19/12 |
| | | | | 704/226 |
| 2005/0267758 | A1 * | 12/2005 | Shi | G10L 13/10 |
| | | | | 704/260 |

(Continued)

FOREIGN PATENT DOCUMENTS

CN    110085245 A * 8/2019    ........... G10L 15/063

*Primary Examiner* — Shreyans A Patel
(74) *Attorney, Agent, or Firm* — Lee, Hong, Degerman, Kang & Waimey PC

(57) ABSTRACT

Disclosed is speech synthesis in a noisy environment. According to an embodiment of the disclosure, a method of speech synthesis may generate a Lombard effect-applied synthesized speech using a feature vector generated from an utterance feature. According to the disclosure, the speech synthesis method and device may be related to artificial intelligence (AI) modules, unmanned aerial vehicles (UAVs), robots, augmented reality (AR) devices, virtual reality (VR) devices, and 5G service-related devices.

18 Claims, 15 Drawing Sheets

(56) References Cited

U.S. PATENT DOCUMENTS

| | | | |
|---|---|---|---|
| 2008/0147392 A1* | 6/2008 | Shaffer | G10L 21/0208 704/233 |
| 2009/0043583 A1* | 2/2009 | Agapi | G10L 13/04 704/260 |
| 2011/0123965 A1* | 5/2011 | Yu | G09B 19/04 434/156 |
| 2012/0296654 A1* | 11/2012 | Hendrickson | G10L 13/033 704/260 |
| 2013/0218566 A1* | 8/2013 | Qian | G10L 13/033 704/260 |
| 2017/0133006 A1* | 5/2017 | Lee | G06N 3/084 |
| 2019/0096385 A1* | 3/2019 | Kang | G10L 25/30 |
| 2019/0311718 A1* | 10/2019 | Huber | G06F 3/013 |
| 2020/0051545 A1* | 2/2020 | Iwase | G10L 15/16 |
| 2020/0066250 A1* | 2/2020 | Morita | G06Q 30/0283 |
| 2020/0106879 A1* | 4/2020 | Wang | G06K 9/00335 |
| 2020/0302913 A1* | 9/2020 | Marcinkiewicz | G06F 40/40 |
| 2021/0005215 A1* | 1/2021 | Fukutomi | G10L 25/84 |

* cited by examiner

SPEECH SYNTHESIS IN NOISY ENVIRONMENT

CROSS-REFERENCE TO RELATED APPLICATION(S)

Pursuant to 35 U.S.C. § 119(a), this application claims the benefit of earlier filing date and right of priority to Korean Patent Application No. 10-2019-0138531, filed on Nov. 1, 2019, the contents of which are hereby incorporated by reference herein in its entirety.

TECHNICAL FIELD

The disclosure concerns speech synthesis in a noisy environment.

DESCRIPTION OF RELATED ART

An artificial intelligence (AI) system is a computer system that achieve human-level intelligence, which, unlike existing rule-based smart systems, makes machines smart enough to learn and decide on their own. The more the artificial intelligence system is used, the higher its recognition rate and the better it understands a user's preferences. Hence, the existing rule-based smart systems are being gradually replaced by deep learning-based artificial intelligence systems.

Artificial intelligence technology has applications in the field of speech synthesis. If located in a noisy environment, a sound output device may not deliver clear notification voice although outputting it at the highest volume.

SUMMARY

The disclosure aims to address the foregoing issues and/or needs.

The disclosure aims to implement speech synthesis, which may deliver clear notification voice in a noisy environment.

The disclosure aims to implement speech synthesis in a noisy environment, which may prevent auditory stress due to excessive sound volume from a user standpoint.

The disclosure also aims to implement speech synthesis in a noisy environment, which may lower performance related to the maximum output sound volume of an output device, thereby saving costs.

According to an embodiment of the disclosure, a method of speech synthesis comprises extracting an utterance feature from a speaker's speech data, generating a feature vector representing the utterance feature, applying the feature vector, text data, and a parameter for controlling speech synthesis to a pre-trained speech synthesis model including a text-to-speech synthesis model, and generating synthesized speech data using an output value from the speech synthesis model. The parameter may include a parameter for adjusting a level at which a Lombard effect applies.

The speech synthesis model may include an artificial neural network model trained using a plurality of pieces of learning text and a learning speech corresponding to the plurality of pieces of learning text. The learning speech may include a speech generated in a noisy environment and reflecting the Lombard effect.

Generating the feature vector may include extracting the utterance feature by applying the speech data to a pre-trained unsupervised learning model.

The method may further comprise measuring a level of external noise and, when the measured level of external noise exceeds a preset threshold, applying the Lombard effect to the synthesized speech using the parameter.

The method may further comprise setting a weight for the parameter to 0 when the level of external noise is less than the preset threshold.

The threshold may be a level of the external noise corresponding to a maximum volume of an external device.

The method may further comprise setting a weight for the parameter to increase in proportion to the level of external noise.

The speech synthesis model may include a recurrent neural network (RNN)-based artificial neural network model.

The feature vector may be extracted from the utterance feature including at least one of an utterance speed of the speaker, pronunciation, accent, idle period, tone, base frequency, vowel utterance duration, harmonic-to-noise ratio (HNR), or inflection included in the speech data.

The speech synthesis model may include an artificial neural network model trained in an end-to-end manner.

The method may further comprise receiving a user's speech signal and an image in a direction along which the speech signal has been received from an external device, determining a distance between the user and the external device from the speech signal and the image in the direction along which the speech signal has been received, and setting a weight for the parameter to increase in proportion to the distance.

According to an embodiment of the disclosure, a speech synthesis device comprises a memory, a transceiver communicating with an external server, and a processor extracting an utterance feature from a speaker's speech data, generating a feature vector representing the utterance feature, applying the feature vector, text data, and a parameter for controlling speech synthesis to a pre-trained speech synthesis model, and generating synthesized speech data using an output value from the speech synthesis model. The parameter may include a parameter for adjusting a level at which a Lombard effect applies.

According to an embodiment of the disclosure, speech synthesis in a noisy environment may provide the following effects.

The disclosure may deliver clear notification voice in a noisy environment.

The disclosure may implement speech synthesis in a noisy environment, which may prevent auditory stress due to excessive sound volume from a user standpoint.

The disclosure may lower performance related to the maximum output sound volume of an output device, thereby saving costs.

Effects of the disclosure are not limited to the foregoing, and other unmentioned effects would be apparent to one of ordinary skill in the art from the following description.

BRIEF DESCRIPTION OF THE DRAWINGS

The accompany drawings, which are included as part of the detailed description in order to help understanding of the present disclosure, provide embodiments of the present disclosure and describe the technical characteristics of the present disclosure along with the detailed description.

DETAILED DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
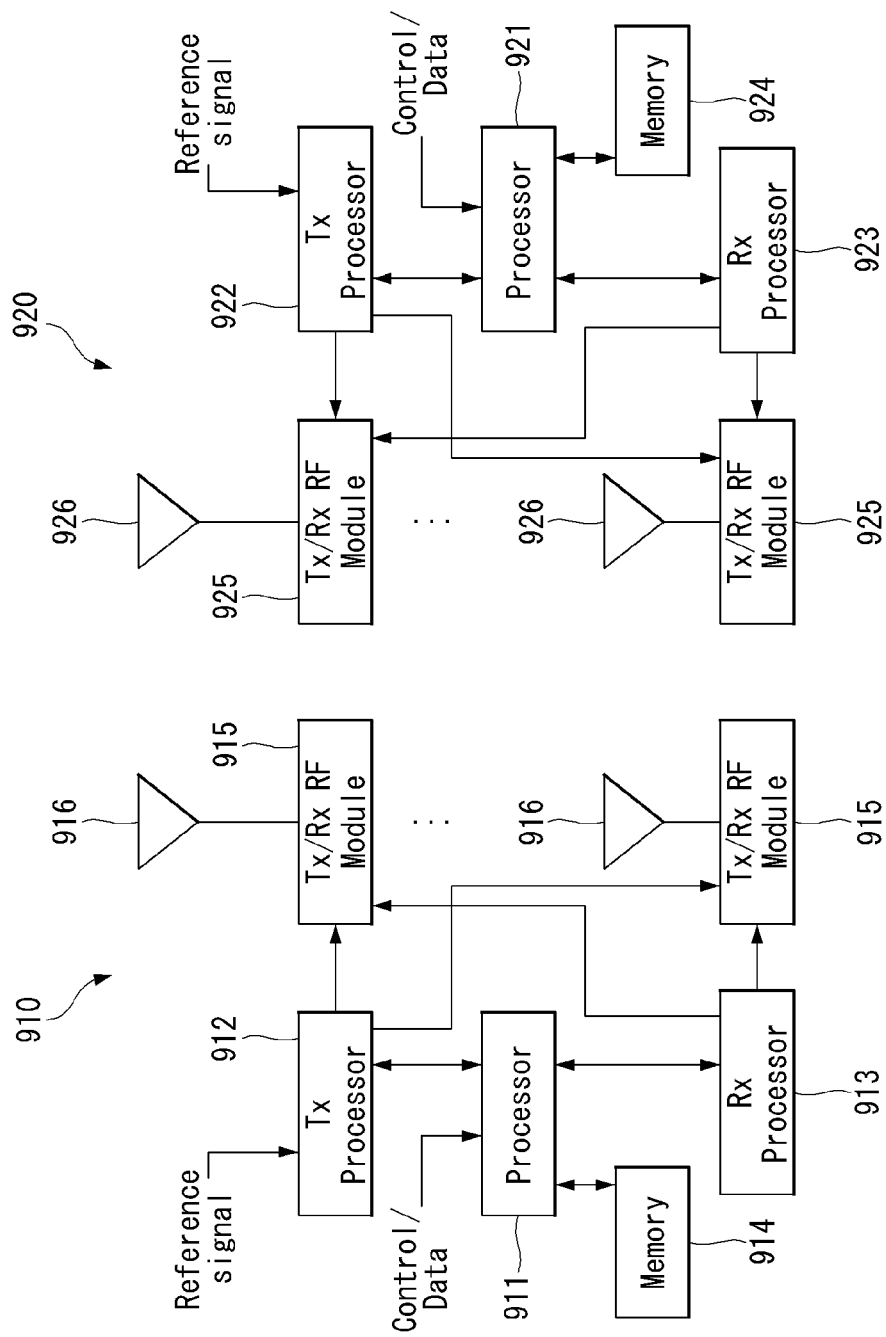
FIG. 1 illustrates a block diagram of a wireless communication system to which the methods proposed in the present disclosure may be applied.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
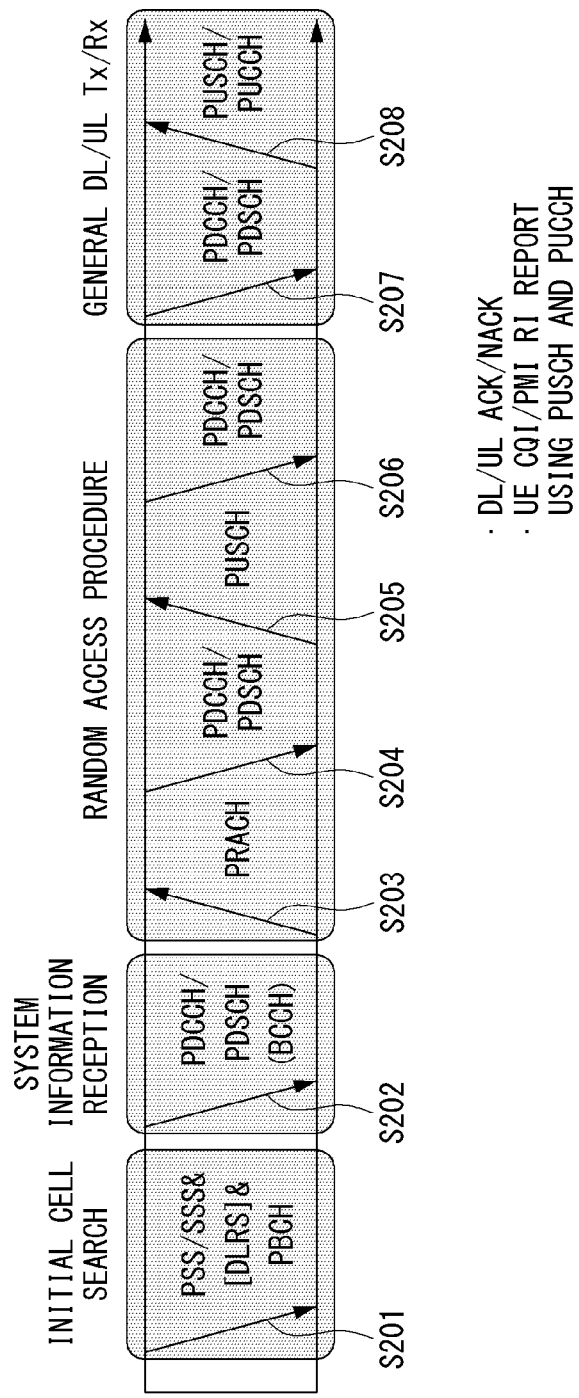
FIG. 2 illustrates an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between User Equipments Using 5G Communication

Figure 3:
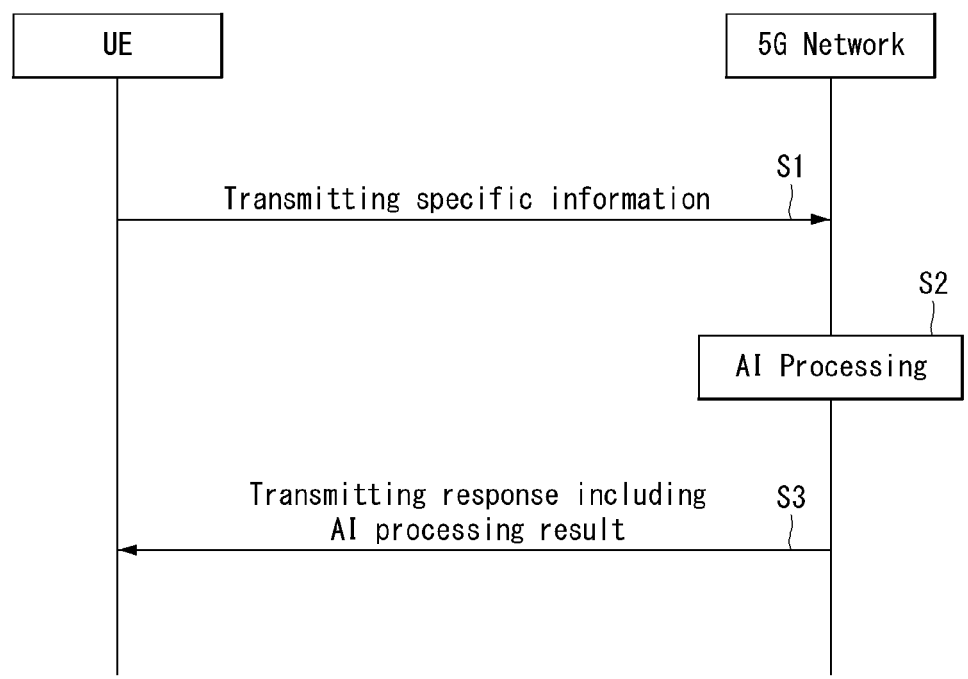
FIG. 3 illustrates an example of a basic operation of a user equipment and a 5G network in a 5G communication system.

FIG. 3 shows an example of basic operations of a user equipment and a 5G network in a 5G communication system.

The user equipment transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the user equipment (S3).

G. Applied Operations Between User Equipment and 5G Network in 5G Communication System Hereinafter, the operation of a user equipment using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the user equipment performs an initial access procedure and a random access procedure with the 5G network prior to step S1 of FIG. 3 in order to transmit/receive signals, information and the like to/from the 5G network.

More specifically, the user equipment performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the user equipment receives a signal from the 5G network.

In addition, the user equipment performs a random access procedure with the 5G network for UL synchronization acquisition and/or UL transmission. The 5G network can transmit, to the user equipment, a UL grant for scheduling transmission of specific information. Accordingly, the user equipment transmits the specific information to the 5G network on the basis of the UL grant. In addition, the 5G network transmits, to the user equipment, a DL grant for scheduling transmission of 5G processing results with respect to the specific information. Accordingly, the 5G network can transmit, to the user equipment, information (or a signal) related to remote control on the basis of the DL grant.

Next, a basic procedure of an applied operation to which a method proposed by the present invention which will be described later and URLLC of 5G communication are applied will be described.

As described above, a user equipment can receive DownlinkPreemption IE from the 5G network after the user equipment performs an initial access procedure and/or a random access procedure with the 5G network. Then, the user equipment receives DCI format 2_1 including a preemption indication from the 5G network on the basis of DownlinkPreemption IE. The user equipment does not perform (or expect or assume) reception of eMBB data in resources (PRBs and/or OFDM symbols) indicated by the preemption indication. Thereafter, when the user equipment needs to transmit specific information, the user equipment can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the user equipment receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the user equipment transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

AI Device

Figure 4:
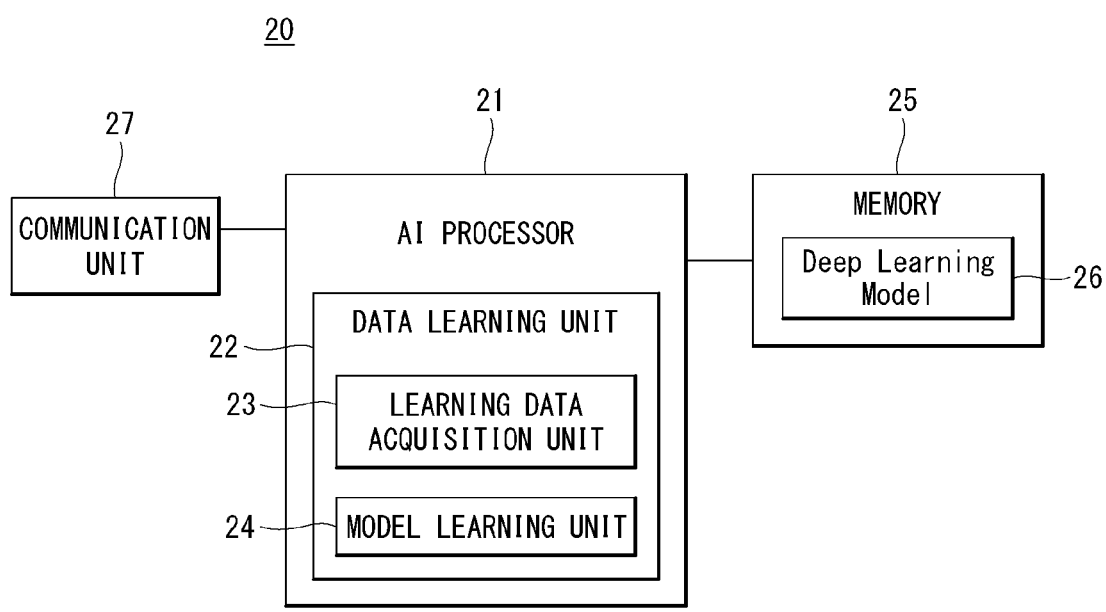
FIG. 4 is a block diagram of an AI device in accordance with the embodiment of the present disclosure.

FIG. 4 is a block diagram of an AI device in accordance with the embodiment of the present disclosure.

The AI device 20 may include electronic equipment that includes an AI module to perform AI processing or a server that includes the AI module.

The AI device 20 may include an AI processor 21, a memory 25 and/or a communication unit 27.

The AI device 20 may be a computing device capable of learning a neural network, and may be implemented as various electronic devices such as a server, a desktop PC, a laptop PC or a tablet PC.

The AI processor 21 may learn the neural network using a program stored in the memory 25. Particularly, the AI processor 21 may learn the neural network for recognizing data related to the intelligent refrigerator 100. Here, the neural network for recognizing data related to the intelligent refrigerator 100 may be designed to simulate a human brain structure on the computer, and may include a plurality of network nodes having weights that simulate the neurons of the human neural network. The plurality of network nodes may exchange data according to the connecting relationship to simulate the synaptic action of neurons in which the neurons exchange signals through synapses. Here, the neural network may include the deep learning model developed from the neural network model. While the plurality of network nodes is located at different layers in the deep learning model, the nodes may exchange data according to the convolution connecting relationship. Examples of the neural network model include various deep learning techniques, such as a deep neural network (DNN), a convolution neural network (CNN), a recurrent neural network (RNN, Recurrent Boltzmann Machine), a restricted Boltzmann machine (RBM,), a deep belief network (DBN) or a deep Q-Network, and may be applied to fields such as computer vision, voice recognition, natural language processing, voice/signal processing or the like.

Meanwhile, the processor performing the above-described function may be a general-purpose processor (e.g. CPU), but may be an AI dedicated processor (e.g. GPU) for artificial intelligence learning.

The memory 25 may store various programs and data required to operate the AI device 20. The memory 25 may be implemented as a non-volatile memory, a volatile memory, a flash memory), a hard disk drive (HDD) or a solid state drive (SDD). The memory 25 may be accessed by the AI processor 21, and reading/writing/correcting/deleting/update of data by the AI processor 21 may be performed.

Furthermore, the memory 25 may store the neural network model (e.g. the deep learning model 26) generated through a learning algorithm for classifying/recognizing data in accordance with the embodiment of the present disclosure.

The AI processor 21 may include a data learning unit 22 which learns the neural network for data classification/recognition. The data learning unit 22 may learn a criterion about what learning data is used to determine the data classification/recognition and about how to classify and recognize data using the learning data. The data learning unit 22 may learn the deep learning model by acquiring the learning data that is used for learning and applying the acquired learning data to the deep learning model.

The data learning unit 22 may be made in the form of at least one hardware chip and may be mounted on the AI device 20. For example, the data learning unit 22 may be made in the form of a dedicated hardware chip for the artificial intelligence AI, and may be made as a portion of the general-purpose processor (CPU) or the graphic dedicated processor (GPU) to be mounted on the AI device 20. Furthermore, the data learning unit 22 may be implemented as a software module. When the data learning unit is implemented as the software module (or a program module including instructions), the software module may be stored in a non-transitory computer readable medium. In this case, at least one software module may be provided by an operating system (OS) or an application.

The data learning unit 22 may include the learning-data acquisition unit 23 and the model learning unit 24.

The learning-data acquisition unit 23 may acquire the learning data needed for the neural network model for classifying and recognizing the data. For example, the learning-data acquisition unit 23 may acquire vehicle data and/or sample data which are to be inputted into the neural network model, as the learning data.

The model learning unit 24 may learn to have a determination criterion about how the neural network model classifies predetermined data, using the acquired learning data. The model learning unit 24 may learn the neural network model, through supervised learning using at least some of the learning data as the determination criterion. Alternatively, the model learning unit 24 may learn the neural network model through unsupervised learning that finds the determination criterion, by learning by itself using the learning data without supervision. Furthermore, the model learning unit 24 may learn the neural network model through reinforcement learning using feedback on whether the result of situation determination according to the learning is correct. Furthermore, the model learning unit 24 may learn the neural network model using the learning algorithm including error back-propagation or gradient descent.

If the neural network model is learned, the model learning unit 24 may store the learned neural network model in the memory. The model learning unit 24 may store the learned neural network model in the memory of the server connected to the AI device 20 with a wire or wireless network.

The data learning unit 22 may further include a learning-data preprocessing unit (not shown) and a learning-data selection unit (not shown) to improve the analysis result of the recognition model or to save resources or time required for generating the recognition model.

The learning-data preprocessing unit may preprocess the acquired data so that the acquired data may be used for learning for situation determination. For example, the learning-data preprocessing unit may process the acquired data in a preset format so that the model learning unit 24 may use the acquired learning data for learning for image recognition.

Furthermore, the learning-data selection unit may select the data required for learning among the learning data acquired by the learning-data acquisition unit 23 or the learning data preprocessed in the preprocessing unit. The selected learning data may be provided to the model learning unit 24. For example, the learning-data selection unit may select only data on the object included in a specific region as the learning data, by detecting the specific region in the image acquired by the camera of the intelligent refrigerator 100.

Furthermore, the data learning unit 22 may further include a model evaluation unit (not shown) to improve the analysis result of the neural network model.

When the model evaluation unit inputs evaluated data into the neural network model and the analysis result outputted from the evaluated data does not satisfy a predetermined criterion, the model learning unit 22 may learn again. In this case, the evaluated data may be predefined data for evaluating the recognition model. By way of example, the model evaluation unit may evaluate that the predetermined criterion is not satisfied when the number or ratio of the evaluated data in which the analysis result is inaccurate among the analysis result of the learned recognition model for the evaluated data exceeds a preset threshold.

The communication unit 27 may transmit the AI processing result by the AI processor 21 to the external electronic equipment.

Although the AI device 20 illustrated in FIG. 4 is functionally divided into the AI processor 21, the memory 25, the communication unit 27 and the like, it is to be noted that the above-described components are integrated into one module, which is referred to as an AI module.

A speech processing process performed in a device environment and/or a cloud environment (or server environment) will be described below with reference to FIGS. 5 and 6.

Figure 5:
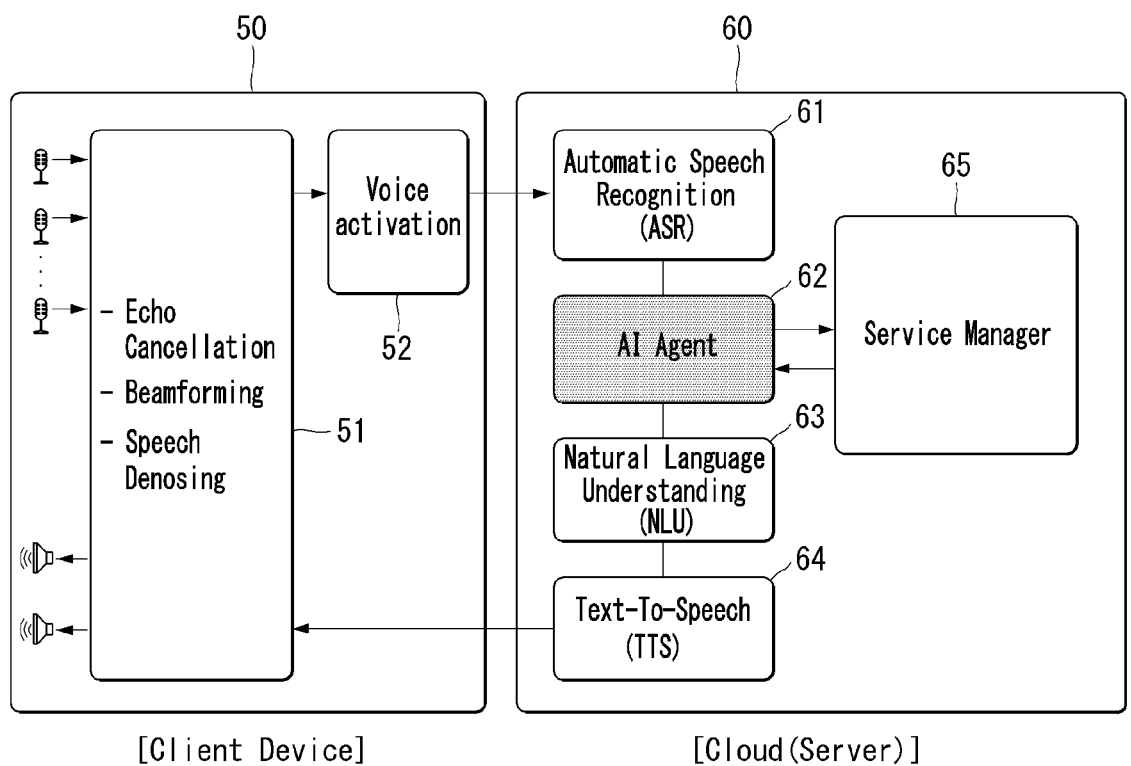
FIG. 5 shows a schematic block diagram of a text-to-speech (TTS) device in a TTS system according to an embodiment of the present disclosure.

FIG. 5 shows an example in which, while a speech can be received in a device 50, a procedure of processing the received speech and thereby synthesize the speech, that is, overall operations of speech synthesis, is performed in a cloud environment 60. On the contrary, FIG. 6 shows an example of on-device processing indicating that a device 70 performs the aforementioned overall operations of speech synthesis by processing a received speech and thereby synthesizing the speech.

Figure 6:
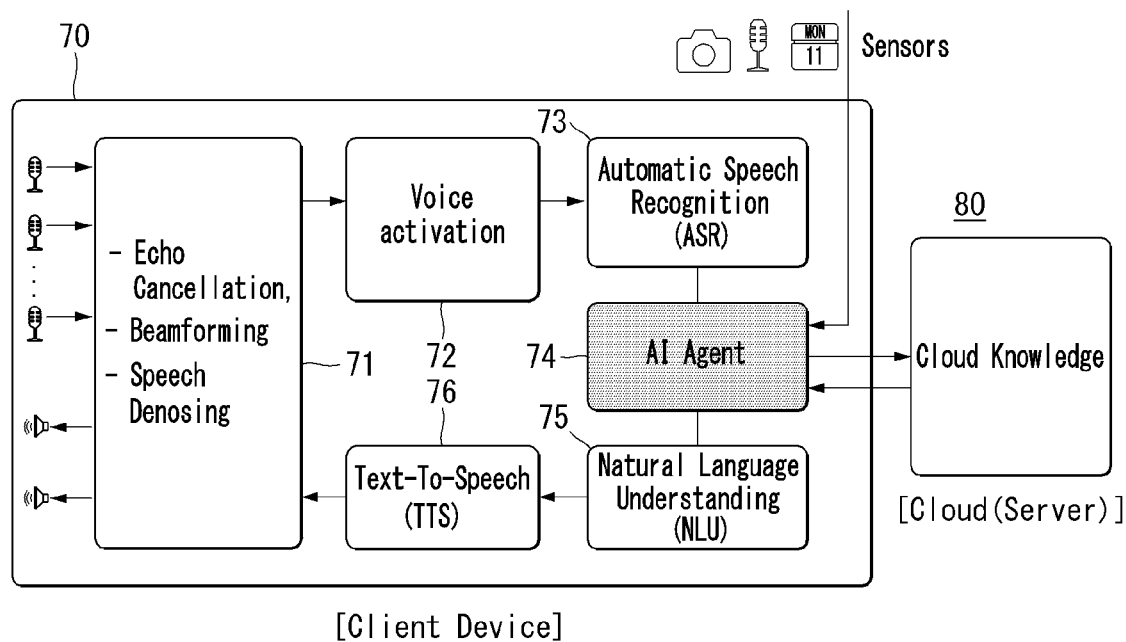
FIG. 6 is a schematic block diagram of a TTS device in a TTS system environment according to an embodiment of the present disclosure.

In FIGS. 5 and 6, the device environments 50 and 70 may be referred to as client devices, and the cloud environments 60 and 80 may be referred to as servers.

FIG. 5 shows a schematic block diagram of a text-to-speech (TTS) device in a TTS system according to an embodiment of the present disclosure.

In order to process a speech event in an end-to-end speech UI environment, various configurations are required. A sequence for processing the speech event performs signal acquisition playback, speech pre-processing, voice activation, speech recognition, natural language processing, and speech synthesis by which a device responds to a user.

The client device 50 may include an input module. The input module may receive a user input from a user. For example, the input module may receive the user input from an external device (e.g., a keyboard and a headset) connected thereto. In addition, for example, the input module may include a touch screen. In addition, for example, the input module may include a hardware key located in a user terminal.

According to an embodiment, the input module may include at least one microphone capable of receiving a user's utterance as a speech signal. The input module may include a speech input system and receive a user's speech as a speech signal through the speech input system. By generating an input signal for an audio input, the at least one microphone may determine a digital input signal for a user's speech. According to an embodiment, multiple microphones may be implemented as an array. The array may be arranged in a geometric pattern, for example, a linear geometric shape, a circular geometric shape, or a different random shape. For example, the array may be in a pattern in which four sensors are placed at 90 degrees to receive sound from four directions. In some embodiments, the microphone may include sensors of different arrays in a space of data communication, and may include a networked array of the sensors. The microphone may include an omnidirectional microphone and a directional microphone (e.g., a shotgun microphone).

The client device 50 may include a pre-processing module 51 capable of pre-processing a user input (speech signal) that is received through the input module (e.g., a microphone).

The pre-processing module 51 may include an adaptive echo canceller (AEC) function to thereby remove echo included in a user speech signal received through the microphone. The pre-processing module 51 may include a noise suppression (NS) function to thereby remove background noise included in a user input. The pre-processing module 51 may include an end-point detect (EPD) function to thereby detect an end point of a user speech and thus find out where the user speech exists. In addition, the pre-processing module 51 may include an automatic gain control (AGC) function to thereby control volume of the user speech in such a way suitable for recognizing and processing the user speech.

The client device 50 may include a voice activation module 52. The voice activation module 52 may recognize a wake-up call indicative of recognition of a user's call. The voice activation module 52 may detect a predetermined keyword (e.g., Hi LG) from a user input which has been pre-processed. The voice activation module 52 may remain in a standby state to perform an always-on keyword detection function.

The client device 50 may transmit a user voice input to a cloud server. ASR and natural language understanding (NLU) operations, which are essential to process a user speech, is generally performed in Cloud due to computing, storage, power limitations, and the like. The Cloud may include the cloud device 60 that processes a user input transmitted from a client. The cloud device 60 may exist as a server.

The cloud device 60 may include an auto speech recognition (ASR) module 61, an artificial intelligent agent 62, a natural language understanding (NLU) module 63, a text-to-speech (TTS) module 64, and a service manager 65.

The ASR module 61 may convert a user input, received from the client device 50, into textual data.

The ASR module 61 includes a front-end speech pre-processor. The front-end speech pre-processor extracts a representative feature from a speech input. For example, the front-perform a Fourier transform on the speech input to extract spectral features that characterize the speech input as a sequence of representative multi-dimensional vectors. In addition, The ASR module 61 may include one or more speech recognition modules (e.g., an acoustic model and/or a language module) and may realize one or more speech recognition engines. Examples of the speech recognition model include Hidden Markov Models, Gaussian-Mixture Models, Deep Neural Network Models, n-gram language models, and other statistical models. Examples of the speech recognition model include a dynamic time warping (DTW)-based engine and a weighted finite state transducer (WFST)-based engine. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens).

Once the ASR module 61 generates a recognition result including a text string (e.g., words, or sequence of words, or sequence of tokens), the recognition result is transmitted to the NLP module 732 for intention deduction. In some examples, The ASR module 730 generates multiple candidate text expressions for a speech input. Each candidate text expression is a sequence of works or tokens corresponding to the speech input.

The NLU module 63 may perform a syntactic analysis or a semantic analysis to determine intent of a user. The syntactic analysis may be used to divide a user input into syntactic units (e.g., words, phrases, morphemes, or the like) and determine whether each divided unit has any syntactic element. The semantic analysis may be performed using semantic matching, rule matching, formula matching, or the like. Thus, the NLU module 63 may obtain a domain, intent, or a parameter (or a slot) necessary to express the intent from a user input through the above-mentioned analysis.

According to an embodiment, the NLU module 63 may determine the intent of the user and a parameter using a matching rule which is divided into a domain, intent, and a parameter. For example, one domain (e.g., an alarm) may include a plurality of intents (e.g., alarm setting, alarm release, and the like), and one intent may need a plurality of parameters (e.g., a time, the number of iterations, an alarm sound, and the like). The plurality of rules may include, for example, one or more mandatory parameters. The matching rule may be stored in a natural language understanding database.

According to an embodiment, the NLU module 63 may determine a meaning of a word extracted from a user input using a linguistic feature (e.g., a syntactic element) such as a morpheme or a phrase and may match the determined meaning of the word to the domain and intent to determine the intent of the user. For example, the NLU module 63 may determine the intent of the user by calculating how many words extracted from a user input are included in each of the domain and the intent. According to an embodiment, the NLU module 63 may determine a parameter of the user input using a word which is the basis for determining the intent. According to an embodiment, the NLU module 63 may determine the intent of the user using a NLU DB which stores the linguistic feature for determining the intent of the user input. According to another embodiment, the NLU module 63 may determine the intent of the user using a personal language model (PLM). For example, the NLU module 63 may determine the intent of the user using personalized information (e.g., a contact list, a music list, schedule information, social network information, etc.). For example, the PLM may be stored in, for example, the NLU DB. According to an embodiment, the ASR module 61 as well as the NLU module 63 may recognize a voice of the user with reference to the PLM stored in the NLU DB.

According to an embodiment, the NLU module 63 may further include a natural language generating module (not shown). The natural language generating module may change specified information to a text form. The information changed to the text form may be a natural language speech. For example, the specified information may be information about an additional input, information for guiding the completion of an action corresponding to the user input, or information for guiding the additional input of the user. The information changed to the text form may be displayed in a display after being transmitted to the client device or may be changed to a voice form after being transmitted to the TTS module.

The TTS module 64 may convert text input to voice output. The TTS module 64 may receive text input from the NLU module 63 of the LNU module 63, may change the text input to information in a voice form, and may transmit the information in the voice form to the client device 50. The client device 50 may output the information in the voice form via the speaker.

The speech synthesis module 64 synthesizes speech outputs based on a provided text. For example, a result generated by the ASR module 61 may be in the form of a text string. The speech synthesis module 64 may convert the text string to an audible speech output. The speech synthesis module 64 may use any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis.

In some examples, the speech synthesis module 64 may be configured to synthesize individual words based on phonemic strings corresponding to the words. For example, a phonemic string can be associated with a word in a generated text string. The phonemic string can be stored in metadata associated with the word. The speech synthesis model 64 may be configured to directly process the phonemic string in the metadata to synthesize the word in speech form.

Since the cloud environment generally has more processing capabilities or resources than the client device, a higher quality speech output may be acquired in synthesis on the client side. However, the present disclosure is not limited thereto, and the speech synthesis process may be performed on the client side (see FIG. 6).

Meanwhile, according to an embodiment, the client environment may further include an Artificial Intelligence (AI) agent 62. The AI agent 62 is defined to perform at least some of the above-described functions performed by the ASR module 61, the NLU module 62 and/or the TTS module 64. In addition, the AI module 62 may make contribution so that the ASR module 61, the NLU module 62 and/or the TTS module 64 perform independent functions, respectively.

The AI agent module 62 may perform the above-described functions through deep learning. The deep learning represents a certain data in a form readable by a computer (e.g., when the data is an image, pixel information is represented as column vectors or the like), and efforts are being made to conduct enormous researches for applying the representation to learning (which is about how to create better representation techniques and how to create a model that learns the better representation techniques), and, as a result, various deep learning techniques such as deep neural networks (DNN), convolutional deep neural networks (CNN), Recurrent Boltzmann Machine (RNN), Restricted Boltzmann Machine (RBM), deep belief networks (DBN), and Deep Q-Network, may be applied to computer vision, speech recognition, natural language processing, speech/signal processing, and the like.

Currently, all commercial speech recognition systems (Microsoft's Cortana, Skype translator, Google Now, Apple Siri, etc.). are based on deep learning techniques.

In particular, the AI agent module 62 may perform various natural language processes, including machine translation, emotion analysis, and information retrieval, to process natural language by use of a deep artificial neural network architecture.

Meanwhile, the cloud environment may include a service manager 65 capable of collecting various personalized information and supporting a function of the AI agent 62. The personalized information acquired through the service manager may include at least one data (a calendar application, a messaging service, usage of a music application, etc.) used through the cloud environment, at least one sensing data (a camera, a microphone, temperature, humidity, a gyro sensor, C-V2X, a pulse, ambient light, Iris scan, etc.) collected by the client device 50 and/or the cloud 60, off device data directly not related to the client device 50. For example, the personalized information may include maps, SMS, news, music, stock, weather, Wikipedia information.

For convenience of explanation, the AI agent 62 is represented as an additional block to be distinguishable from the ASR module 61, the NLU module 63, and the TTS module 64, but the AI agent 62 may perform at least some or all of the functions of the respective modules 61, 62, and 64.

In FIG. 5, an example in which the AI agent 62 is implemented in the cloud environment due to computing calculation, storage, power limitations, and the like, but the present disclosure is not limited thereto.

For example, FIG. 6 is identical to what is shown in FIG. 5, except for a case where the AI agent is included in the cloud device.

FIG. 6 is a schematic block diagram of a TTS device in a TTS system environment according to an embodiment of the present disclosure.

A client device 70 and a cloud environment 80 shown in FIG. 6 may correspond to the client device 50 and the cloud device 60 aforementioned in FIG. 5, except for some configurations and functions. Accordingly, description about specific functions of corresponding blocks may refer to FIG. 5.

Referring to FIG. 6, the client device 70 may include a pre-processing module 71, a voice activation module 72, an ASR module 73, an AI agent 74, an NLU module 75, and a TTS module 76. In addition, the client device 70 may include an input module (at least one microphone) and at least one output module.

In addition, the cloud environment may include cloud knowledge 80 that stores personalized information in a knowledge form.

A function of each module shown in FIG. 6 may refer to FIG. 5. However, since the ASR module 73, the NLU module 75, and the TTS module 76 are included in the client device 70, communication with Cloud may not be necessary for a speech processing procedure such as speech recognition, speech synthesis, and the like, and thus, an instant real-time speech processing operation is possible.

Each module shown in FIGS. 5 and 6 are merely an example for explaining a speech processing procedure, and modules more or less than in FIGS. 5 and 6 may be included. In addition, two or more modules may be combined or different modules or modules with different arrangement structures may be included. The various modules shown in FIGS. 5 and 6 may be implemented in hardware, software instructions for execution by one or more processors, firmware, including one or more signal processing and/or application specific integrated circuits, or a combination thereof.

Figure 7:
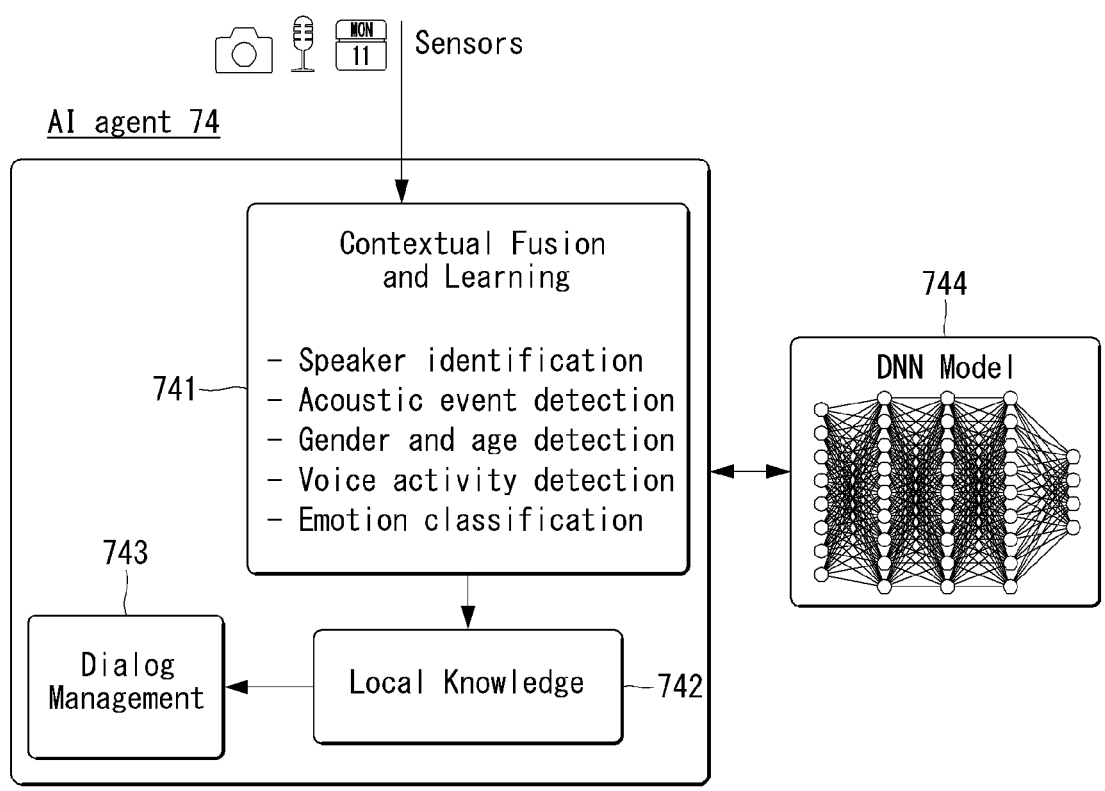
FIG. 7 is a schematic block diagram of an AI agent capable of performing emotion classification information-based TTS according to an embodiment of the present disclosure.

FIG. 7 is a schematic block diagram of an AI agent capable of performing emotion classification information-based TTS according to an embodiment of the present disclosure.

Referring to FIG. 7, in the speech processing procedure described with reference to FIGS. 5 and 6, the AI agent 74 may support an interactive operation with a user, in addition to an ASR operation, an NLU operation, and a TTS operation. Alternatively, using context information, the AI agent 74 may make contribution so that the NLU module 63 and 75 further clarify, complements, or additionally define information included in text expressions received from the ASR module 61 and 73.

Here, the context information may include preference of a user of a client device, hardware and/or software states of the client device, various types of sensor information received before, during, or after a user input, previous interactions (e.g., dialogue) between the AI agent and the user, etc. In the present disclosure, the context information is dynamic and varies depending on time, location, contents of the dialogue, and other elements.

The AI agent 74 may further include a context fusion and learning module 741, a local knowledge 742, and a dialogue management 743.

The context fusion and learning module 741 may learn a user's intent based on at least one data. The at least one data may further include at least one sensing data acquired by a client device or a cloud environment. In addition, the at least one data may further include speaker identification, acoustic event detection, a speaker's personal information (gender and age detection), voice activity detection (VAD), and emotion classification information.

The speaker identification may indicate specifying a speaker in a speaker group registered by a speech. The speaker identification may include identifying a pre-registered speaker or registering a new speaker. The acoustic event detection may outdo a speech recognition technique and may be used to recognize acoustics itself to recognize a type of sound and a place where the sound occurs. The VAD is a speech processing technique of detecting presence or absence of a human speech (voice) from an audio signal that can include music, noise, or any other sound. According to an embodiment, the AI agent 74 may detect presence of a speech from the input audio signal. According to an embodiment the AI agent 74 differentiates a speech data and a non-speech data using a deep neural networks (DNN) model. In addition, the AI agent 74 may perform emotion classification information on the speech data using the DNN model. According to the emotion classification information, the speech data may be classified as anger, boredom, fear, happiness, or sadness.

The contest fusion and learning module 741 may include a DNN model to perform the above-described operation, and may determine intent of a user input based on sensing information collected in the DNN model, the client device or the cloud environment.

The at least one data is merely an example and may include any data that can be referred to so as to determine intent of a user in a speech processing procedure. The at least one data may be acquired through the above-described DNN model.

The AI agent 74 may include the local knowledge 742. The local knowledge 742 may include user data. The user data may include a user's preference, the user's address, the user's initially set language, the user's contact list, etc. According to an embodiment, the AI agent 74 may additionally define the user's intent by complementing information included in the user's speech input using the user's specific information. For example, in response to the user's request "Invite my friends to my birthday party", the AI agent 74 does not request more clarified information from the user and may utilize the local knowledge 742 to determine who "the friends" are and when and where the "birthday" takes place.

The AI agent 74 may further include the dialogue management 743. The AI agent 74 may provide a dialogue interface to enable speech conversation with the user. The dialogue interface may refer to a procedure of outputting a response to the user's speech input through a display or a speaker. Here, a final result output through the dialogue interface may be based on the ASR operation, the NLU operation, and the TTS operation, which are described above.

Figure 8:
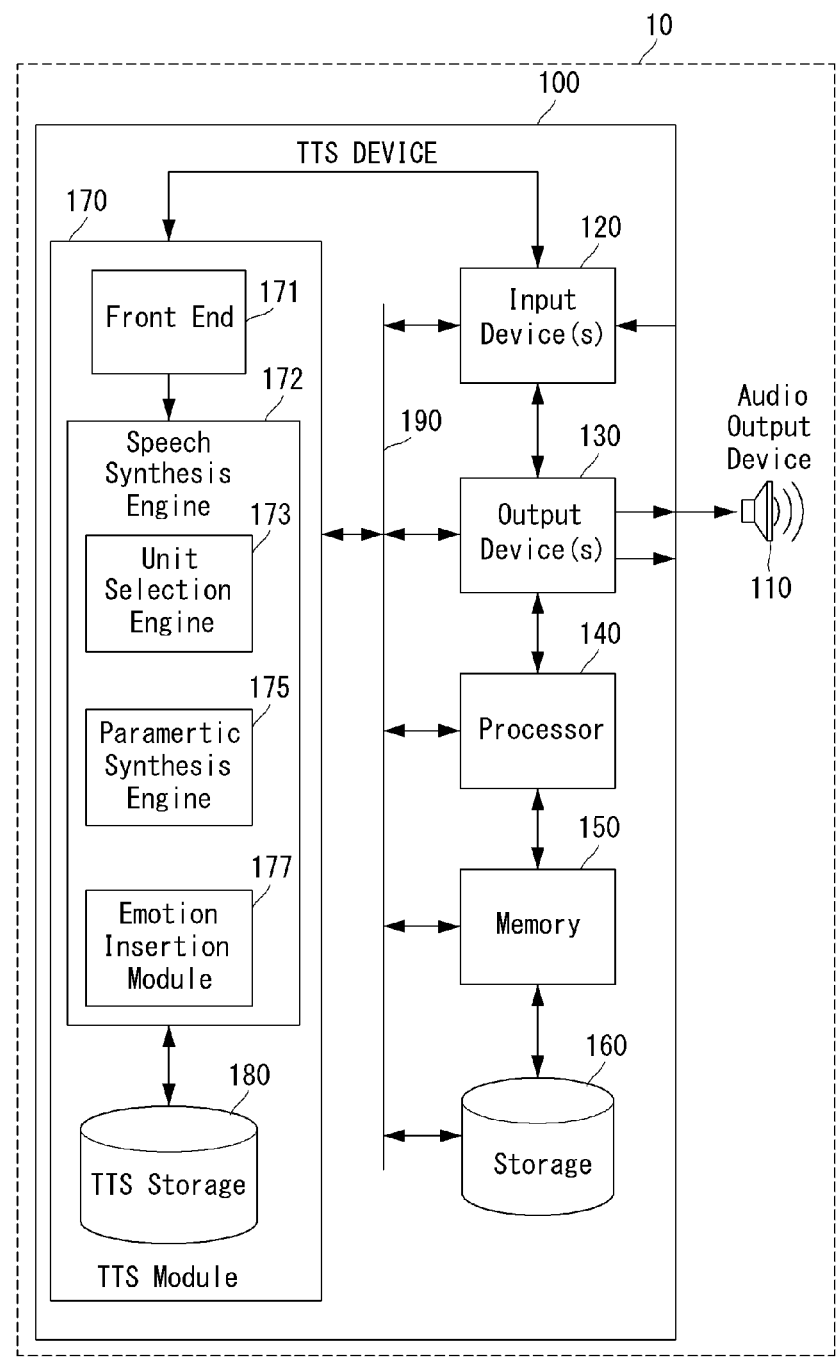
FIG. 8 is a block diagram illustrating an example speech synthesizing device according to an embodiment of the disclosure.

FIG. 8 is a block diagram illustrating an example speech synthesizing device according to an embodiment of the disclosure.

An intelligent device 10 shown in FIG. 8 may include a TTS device 100. A TTS device 100 may include an audio output device 110 for outputting a speech processed by the TTS device 100 or by a different device.

FIG. 8 discloses the TTS device 100 for performing speech synthesis. An embodiment of the present disclosure may include computer-readable and computer-executable instructions that can be included in the TTS device 100. Although FIG. 8 discloses a plurality of elements included in the TTS device 100, configurations not disclosed herein may be included in the TTS device 100.

Meanwhile, some configurations disclosed in the TTS device 100 may be single configurations and each of them may be used multiple times in one device. For example, the TTS device 100 may include a plurality of input devices 120, an output device 130 or a plurality of controllers/processors 140.

A plurality of TTS devices may be applied to one intelligent device. In such a multiple device system, the TTS device may include different configurations to perform various aspects of speech synthesis. The TTS device shown in FIG. 8 is merely an exemplary, may be an independent device, and may be implemented as one configuration of a large-sized device or system.

According to an embodiment of the present disclosure, a plurality of difference devices and a computer system may be, for example, applied to a universal computing system, a server-client computing system, a telephone computing system, a laptop computer, a mobile terminal, a PDA, and a tablet computer, etc. The TTS device 100 may be applied as a different device providing a speech recognition function, such as ATMs, kiosks, a Global Positioning System (GPS), a home appliance (e.g., a refrigerator, an oven, a washing machine, etc.), vehicles, ebook readers, etc. or may be applied as a configuration of the system.

Referring to FIG. 8, the TTS device 100 may include a speech output device 110 for outputting a speech processed by the TTS device 100 or by a different device. The speech output device 110 may include a speaker, a headphone, or a different appropriate configuration for transmitting a speech. The speech output device 110 may be integrated into the TTS device 100 or may be separated from the TTS device 100.

The TTS device 100 may include an address/data bus 224 for transmitting data to configurations of the TTS device 100. The respective configurations in the TTS device 100 may be directly connected to different configurations through the bus 224. Meanwhile, the respective configurations in the TTS device 100 may be directly connected to a TTS module 170.

The TTS device 100 may include a controller (processor) 140. A processor 140 may correspond to a CPU for processing data and a memory for storing computer-readable instructions to process data and storing the data and the instructions. The memory 150 may include a volatile RAM, a non-volatile ROM, or a different-type memory.

The TTS device 100 may include a storage 160 for storing data and instructions. The storage 160 may include a magnetic storage, an optical storage, a solid-state storage, etc.

The TTS device 100 may access a detachable or external memory (e.g., a separate memory card, a memory key drive, a network storage, etc.) through an input device 120 or an output device 130.

Computer instructions to be processed by the processor 140 to operate the TTS device 100 and various configurations may be executed by the processor 140 and may be stored in the memory 150, the storage 160, an external device, or a memory or storage included in the TTS module 170 described in the following. Alternatively, all or some of executable instructions may be added to software and thus embedded in hardware or firmware. An embodiment of the present disclosure may be, for example, implemented as any of various combinations of software, firmware and/or hardware.

The TTS device 100 includes the input device 120 and the output device 130. For example, the input device a microphone, a touch input device, a keyboard, a mouse, a stylus, or the audio output device 100 such as a different input device. The output device 130 may include a visual display or tactile display, an audio speaker, a headphone, a printer, or any other output device. The input device 120 and/or the output device 130 may include an interface for connection with an external peripheral device, such as a Universal Serial Bus (USB), FireWire, Thunderbolt, or a different access protocol. The input device 120 and/or the output device 130 may include a network access such as an Ethernet port, a modem, etc. The input device 120 and/or the output device may include a wireless communication device such as radio frequency (RF), infrared rays, Bluetooth, wireless local area network (WLAN) (e.g., WiFi and the like) or may include a wireless network device such as a 5G network, a long term evolution (LTE) network, a WiMAN network, and a 3G network. The TTS device 100 may include the Internet or a distributed computing environment through the input device 120 and/or the output device 130.

The TTS device 100 may include the TTS module 170 for processing textual data into audio waveforms including speeches.

The TTS module 170 may access to the bus 190, the input device 120, the output device 130, the audio output device 110, the processor 140, and/or a different configuration of the TTS device 100.

The textual data may be generated by an internal configuration of the TTS device 100. In addition, the textual data may be received from an input device such as a keyboard or may be transmitted to the TTS device 100 through a network access. A text may be a type of a sentence including a text, a number and/or a punctuation to convert into a speech by the TTS module 170. An input text may include a special annotation for processing by the TTS module 170 and may use the special annotation to indicate how a specific text is to be pronounced. The textual data may be processed in real time or may be stored or processed later on.

The TTS module 170 may include a front end 171, a speech synthesis engine 172, and a TTS storage 180. The front end 171 may convert input textual data into symbolic linguistic representation for processing by the speech synthesis engine 172. The speech synthesis engine 172 may convert input text into a speech by comparing annotated phonetic unit models and information stored in the TTS storage 180. The front end 171 and the speech synthesis engine 172 may include an embedded internal processor or memory, or may use a processor 140 included in the TTS device 100 or a memory. Instructions for operating the front end 171 and the speech synthesis engine 172 may be included in the TTS module 170, the memory 150 of the TTS device 100, the storage 160, or an external device.

Input of a text into the TTS module 170 may be transmitted to the front end 171 for a processing. The front end 171 may include a module for performing text normalization, linguistic analysis, and linguistic prosody generation.

While performing the text normalization, the front end 171 may process a text input and generate a standard text to thereby convert numbers, abbreviations, and symbols identically.

While performing the linguistic analysis, the front end 171 may generate language of a normalized text to generate a series of phonetic units corresponding to an input text. This process may be referred to as phonetic transcription. The phonetic units include symbol representation of sound units that are lastly coupled and output by the TTS device 100 as a speech. Various sound units may be used to divide a text for speech synthesis. The TTS module 170 may process a speech based on phonemes (individual acoustics), half-phonemes, di-phones (the last half of a phoneme coupled to a half of a neighboring phoneme), bi-phones (two continuous phones), syllables, words, phrases, sentences, or other units. Each word may be mapped to one or more phonetic units. Such mapping may be performed using a language dictionary stored in the TTS device 100.

Linguistic analysis performed by the front end 171 may include a process of identifying different syntactic elements, such as prefixes, suffixes, phrases, punctuations, and syntactic boundaries. Such syntactic elements may be used to output a natural audio waveform by the TTS module 170. The language dictionary may include letter-to-sound rules and other tools for pronouncing a previously unidentified word or letter combination that can be made by the TTS module 170. In general, the more the information is included in the language dictionary, the higher the quality of speech output can be ensured.

Based on the linguistic analysis, the front end 171 may generate linguistic prosody of which annotation is processed to prosodic characteristics so that phonetic units represent how final acoustic units has to be pronounced in a final output speech.

The prosodic characteristics may be referred to as acoustic features. While an operation of this step is performed, the front end 171 may integrate the acoustic features into the TTS module 170 in consideration of random prosodic annotations that accompanies a text input. Such acoustic features may include pitch, energy, duration, etc. Application of the acoustic features may be based on prosodic models that can be used by the TTS module 170. Such prosodic models represent how phonetic units are to be pronounced in a specific situation. For example, the prosodic models may take into consideration of a phoneme's position in a syllable, a syllable's position in a word, a word's position in a sentence or phrase, neighboring phonetic units, etc. Like the language dictionary, the more information on prosodic models exists, the higher the quality of speech output is ensured.

An output from the front end 171 may include a series of phonetic units which are annotation-processed into prosodic characteristics. The output from the front end 171 may be referred to as symbolic linguistic representation. The symbolic linguistic representation may be transmitted to the speech synthesis engine 172. The speech synthetic engine 172 may convert the speech into an audio wave so as to output the speech to a user through the audio output device 110. The speech synthesis engine 172 is configured to convert an input test into a high-quality natural speech in an efficient way. Such a high-quality speech may be configured to be pronounced in a similar way of a human speaker as much as possible.

The speech synthesis engine 172 may perform synthesis using at least one or more other methods.

The unit selection engine 173 compares a recorded speech database with a symbolic linguistic representation generated by the front end 171. The unit selection engine 173 matches the symbol linguistic representation and a speech audio unit in the recorded speech database. In order to form a speech output, matching units may be selected and the selected matching units may be connected to each other. Each unit includes audio waveforms, which correspond to a phonetic unit such as a short WAV file of specific sound along with description of various acoustic features associated with the WAV file (pitch, energy, etc.), and also includes other information such as a position at which the phonetic unit is represented in a word, a sentence, a phrase, or a neighboring phonetic unit.

The unit selection engine 173 may match an input text using all information in a unit database in order to generate a natural waveform. The unit database may include examples of multiple speech units that provide different options to the TTS device 100 to connect the units to a speech. One of advantages of unit selection is that a natural speech output can be generated depending on a size of the database. In addition, the greater the unit database, the more natural the speech can be constructed by the TTS device 100.

Meanwhile, speech synthesis can be performed not just by the above-described unit selection synthesis, but also by parameter synthesis. In the parameter synthesis, synthesis parameters such as frequency, volume, and noise can be varied by a parameter synthesis engine 175, a digital signal processor, or a different audio generating device in order to generate artificial speech waveforms.

The parameter synthesis may match symbolic linguistic representation with a desired output speech parameter by using an acoustic model and various statistical techniques. In the parameter synthesis, a speech can be processed even without a large-capacity database related to unit selection and a processing can be performed at a high speed. The unit selection synthesis technique and the parameter synthesis technique may be performed individually or in combination to thereby generate a speech audio output.

The parameter speech synthesis may be performed as follows. The TTS module 170 may include an acoustic model that can transform symbolic linguistic representation into a synthetic acoustic waveform of a test input based on audio signal manipulation. The acoustic model may include rules that can be used by the parameter synthesis engine 175 to allocate specific audio waveform parameters to input phonetic units and/or prosodic annotations. The rules may be used to calculate a score indicating a probability that a specific audio output parameter (frequency, volume, etc.) may correspond to input symbolic linguistic representation from the pre-processor 171.

The parameter synthesis engine 175 may apply multiple techniques to match a speech to be synthesized with an input speech unit and/or a prosodic annotation. One of general techniques employs Hidden Markov Model (HMM). The HMM may be used to determine a probability for an audio output to match a text input. In order to artificially synthesize a desired speech, the HMM may be used to convert linguistic and acoustic space parameters into parameters to be used by a vocoder (digital voice encoder).

The TTS device 100 may include a speech unit database to be used for unit selection.

The speech unit database may be stored in the TTS storage 180, the storage 160, or another storage configuration. The speech unit database may include a recorded speech voice. The speech voice may be a text corresponding to utterance contents. In addition, the speech unit database may include a recorded speech (in the form of an audio waveform, a feature factor, or another format) occupying a considerable storage space in the TTS device 100. Unit samples in the speech unit database may be classified in various ways including a phonetic unit (a phoneme, a diphone, a word, and the like), a linguistic prosody label, an acoustic feature sequence, a speaker identity, and the like.

When matching symbolic linguistic representation, the speech synthesis engine 172 may select a unit in the speech unit database that most closely matches an input text (including both a phonetic unit and a prosodic symbol annotation). In general, the large the capacity of the speech unit database, the more the selectable unit samples and thus the more accurate the speech output.

Audio waveforms including a speech output to a user may be transmitted to the audio output device 110 from the TTS module 213 so that the audio waveforms are output to a user. Audio waveforms including a speech may be stored in multiple different formats such as feature vectors, non-compressed audio data, or compressed audio data. For example, an audio output may be encoded and/or compressed by an encoder/decoder before the transmission. The encoder/decoder may encode or decode audio data such as digitalized audio data, feature vectors, etc. In addition, the function of the encoder/decoder may be included in an additional component or may be performed by the processor 140 and the TTS module 170.

Meanwhile, the TTS storage 180 may store different types of information for speech recognition.

Contents in the TTS storage 180 may be prepared for general TTS usage and may be customized to include sound and words that can be used in a specific application. For example, for TTS processing by a GPS device, the TTS storage 180 may include a customized speech specialized in position and navigation.

In addition, the TTS storage 180 may be customized to a user based on a personalized desired speech output. For example, the user may prefer an output voice of a specific gender, a specific accent, a specific speed, a specific emotion (e.g., a happy voice). The speech synthesis engine 172 may include a specialized database or model to explain such user preference.

The TTS device 100 may perform TTS processing in multiple languages. For each language, the TTS module 170 may include data, instructions, and/or components specially configured to synthesize a speech in a desired language.

For performance improvement, the TTS module 213 may modify or update contents of the TTS storage 180 based on a feedback on a TTS processing result, and thus, the TTS module 170 may improve speech recognition beyond a capability provided by a training corpus.

As the processing capability of the TTS device 100 improves, a speech output is possible by reflecting an attribute of an input text. Alternatively, although an emotion attribute is not included in the input text, the TTS device 100 may output a speech by reflecting intent (emotion classification information) of a user who has written the input text. In addition, the TTS storage 180 may be customized to a user based on a personalized desired speech output. For example, the user may prefer an output voice of a specific gender, a specific accent, a specific speed, a specific emotion (e.g., a happy voice). The speech synthesis engine 172 may include a specialized database or model to explain such user preference.

The TTS device 100 may perform TTS processing in multiple languages. For each language, the TTS module 170 may include data, instructions, and/or components specially configured to synthesize a speech in a desired language.

For performance improvement, the TTS module 170 may modify or update contents of the TTS storage 180 based on a feedback on a TTS processing result, and thus, the TTS module 170 may improve speech recognition beyond a capability provided by a training corpus.

The TTS system may integrate the various components and other components above-mentioned. For example, the TTS device 100 may contain blocks for speaker selection.

The speaker selection module 177 may be provided for each character in the script. The speaker selection module 177 may be incorporated into the TTS module 170 or as part of the pre-processor 171 or speech synthesis engine 172. The speaker selection module 177 using metadata corresponding to the speaker profile so that text corresponding to multiple attributes may be synthesized into the voice of the set speaker.

According to an embodiment of the present disclosure, the metadata may be in markup language and preferably in speech synthesis markup language (SSML).

According to an embodiment of the disclosure, a speech synthesis device may implement a Lombard speech synthesis device. Hereinafter, a speech synthesis method implementing the Lombard effect and a Lombard speech synthesis device for implementing the same are described below in detail, according to the disclosure.

Lombard Speech Synthesis Device

Lombard speech synthesis device (Lombard TTS device) denotes a speech synthesis device that implements the Lombard effect using the above-described TTS device 100. In the Lombard effect, the speaker actively varies the pitch or inflection of voice tone to overcome ambient noise.

According to an embodiment of the disclosure, the intelligent device 10 may include an input device. The input device may include a microphone. The microphone may be provided for speech recognition and may receive external noise or the speaker's input speech and convert it into an electrical signal. The microphone may be controlled to remain always on and transfer sound signals to the speech synthesis device.

The processor 140 of the Lombard speech synthesis device may perform other various sound processing operations than the above-described TTS device 100. As an example, the processor 140 may measure the external noise caused from the surroundings of the speech synthesis device using the sound signal input to the microphone. For example, the processor 140 may measure the external noise using the sound signal received by the microphone and divide the measured external noise into at least one or more levels.

The processor 140 may determine a proper volume of the intelligent device 10 for the received external noise. As an example, the processor 120 may control to increase the output sound volume of the speaker in proportion to the magnitude of the external noise. As another example, if the magnitude of the external noise exceeds a preset threshold, the processor 140 may control the TTS device 100 to allow a specific utterance style to apply the output sound of the intelligent device 10. At this time, the specific utterance style may be a Lombard style. The Lombard style denotes a Lombard effect-reflected utterance style.

The processor 140 may synthesize an output sound using a deep learning model. At this time, the output sound may be stored as pulse code modulation (PCM) data.

The processor 140 may generate a Lombard indicator. The processor 140 may switch control modes of the speech synthesis device depending on whether there is the Lombard indicator. The control modes of the speech synthesis device may include a first control mode in which the magnitude of a sound signal output from the speaker is increased in proportion to the magnitude of the external sound or a second control mode in which a specific signal pattern is assigned to the sound signal output from the speaker.

The processor 140 may perform control so that the speech synthesized by the TTS module is amplified to have a required volume and is output via the speaker. The required volume may be set to differ depending on the degree of external noise of the intelligent device 10 as described above. For example, as the magnitude of external noise is elevated, the magnitude of sound signal output from the speaker may increase.

According to an embodiment of the disclosure, the intelligent device 10 may include an output device. The output device may include a speaker. The speaker may output a speech generated as a result of speech synthesis processing by the intelligent device 10.

According to an embodiment of the disclosure, the Lombard speech synthesis method may be implemented on the TTS device 100 described above in connection with FIGS. 5 to 8. Described below in detail with reference to the drawings are a Lombard-style speech synthesis method and operations of implementing the same by the intelligent device 10 according to an embodiment of the disclosure.

Figure 9:
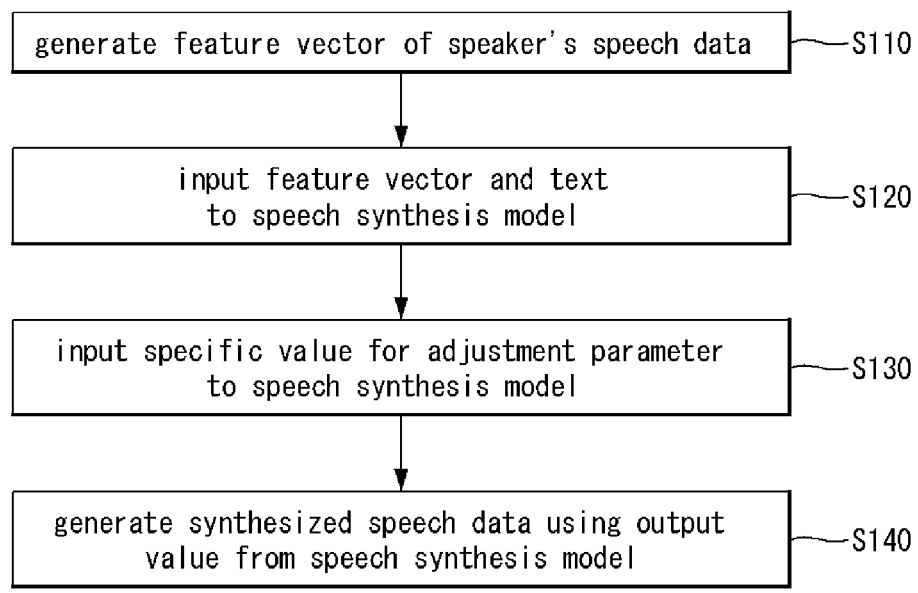
FIG. 9 is a flowchart schematically illustrating a speech synthesis method according to an embodiment of the disclosure.

FIG. 9 is a flowchart schematically illustrating a Lombard-style speech synthesis method according to an embodiment of the disclosure.

The processor 140 may extract utterance features from the speaker's speech data and generate a feature vector representing the utterance features (S110).

The speaker may include a voice actor, actor, or singer that provides speech samples, and the speech samples are a speech data set including speeches of the voice actor, actor, or singer. The utterance features may include at least one or more of the utterance speed of the speaker, pronunciation, accent, idle period, tone, base frequency, vowel utterance duration, harmonic-to-noise ratio (HNR), or inflection included in the speaker's speech data. Utterance feature may be interchangeably used with vocal feature, and these terms are not different in meaning.

The feature vector may be extracted from the utterance features including at least one or more of the utterance speed of the speaker, pronunciation, accent, idle period, tone, base frequency, vowel utterance duration, HNR, or inflection included in the speaker's speech data.

The processor 140 may extract the utterance features by inputting the speaker's speech data to a pre-trained unsupervised learning model. According to an embodiment of the disclosure, the unsupervised learning model may also be referred to as a feature extraction model. As an example, the feature extraction model may be a model such as an autoencoder. In the autoencoder, a section of the input layer and hidden layer is denoted an encoder, and a section of the hidden layer and output layer is denoted a decoder. A major operation of the autoencoder is to reduce the dimension of the input vector.

The feature extraction model may be used to extract the feature vector corresponding to the speaker's tone of speech data input by the speaker.

The processor 140 may input the feature vector and text data to a pre-trained text-to-speech synthesis model (S120).

The text data corresponds to the content of a speech to be synthesized. In the inference step, the speech synthesis model may use a pre-trained artificial neural network model that may be trained by a server (e.g., 60 of FIG. 5) or a 5G network. The step of generating a speech synthesis model is described below with reference to FIG. 10.

The processor 140 may input a specific value for an adjustment parameter for adjusting the utterance style of the synthesized speech in the speech synthesis model to the speech synthesis model (S130).

The adjustment parameter has a specific value corresponding to the degree of applying the utterance style of the synthesized speech in the speech synthesis model. The specific value may be a weight used to determine the degree of application of the utterance style. According to an embodiment of the disclosure, the adjustment parameter is used as a factor for adjusting the degree of giving the Lombard effect to speech synthesis.

As an example, if the degree of giving the Lombard effect ranges from 0 to 10, and the processor 140 inputs an adjustment parameter of 0 to the speech synthesis model, a synthesized speech with no Lombard effect applied thereto may be generated. In contrast, if the processor 140 inputs an adjustment parameter of 10 to the speech synthesis model, a synthesized speech to which a large Lombard effect has been applied may be produced. In other words, the degree of application of the Lombard effect to speech synthesis may be determined in proportion to the specific value for the adjustment parameter.

The adjustment parameter may be a value learned during the course of training a language learning model. As an example, the degree of applying the Lombard effect to speech synthesis may be assessed, and a value closer to 1 as the Lombard effect is applied more noticeably, and a value closer to 0 as the Lombard effect is less applied, may be given while training the speech synthesis model.

According to an embodiment of the disclosure, the adjustment parameter may be set to differ depending on the level of external noise caused in the surroundings of the external device 10 and, resultantly, the Lombard effect may be applied differently depending on the degree of external noise. This is described below in further detail with reference to FIG. 11.

The processor 140 may generate speech synthesis data using the output value from the speech synthesis model (S140).

The processor 140 may synthesize a speech using an artificial neural network-based speech synthesis model. The speech synthesis model features using a specific speaker's speech features. The speech synthesis model also features the use of an adjustment parameter by which the degree of application of the Lombard style may be adjusted.

The speech synthesis processing described above in connection with FIG. 9 may be performed by at least one or more servers or a 5G network, but not limited thereto or thereby. As an example, the functions that may be performed by at least one or more servers or a 5G network may also be performed by a terminal (or user equipment (UE)). To that end, the terminal may include a plurality of processors.

Figure 10:
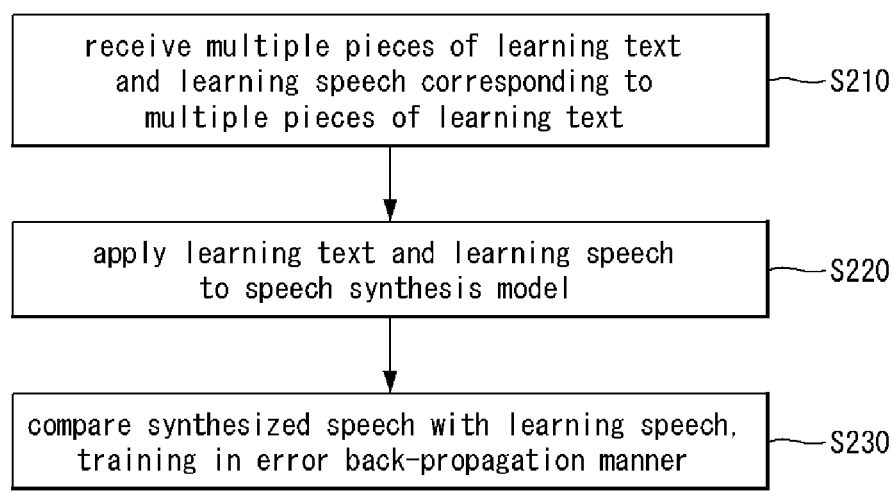
FIG. 10 is a flowchart illustrating a method of training a deep learning model applied to an embodiment of the disclosure.

FIG. 10 is a flowchart illustrating a method of training a deep learning model applied to an embodiment of the disclosure.

The processor 140 may include a plurality of pieces of learning text and a learning speech corresponding to the plurality of pieces of learning text (S210).

The processor 140 may apply the received pieces of learning text and learning speech corresponding to the pieces of learning text to a speech synthesis model (S220).

The processor 140 may compare the learning speech with a synthesized speech generated from the output value of the speech synthesis model and train the speech synthesis model in an error back propagation scheme (S230).

According to an embodiment of the disclosure, the speech synthesis model may be a recurrent neural network (RNN)-based artificial neural network model. The RNN is a powerful dynamic system and has a hidden layer between the input and output and has a state value represented as continuous vectors therein. The RNN has parameters, i.e., input end matrix U, state transition matrix W, and output end matrix V. However, as inference is conducted, it expands as much as the sequence length and a deep structure is generated. Further, it is possible to use a model that may adjust the input/output and flow of transition information depending on the input and the state value of the hidden layer, such as long short-term memory (LSTM) or gated recurrent unit (GRU).

The artificial neural network model applied to various embodiments of the disclosure may be an artificial neural network model trained in an end-to-end manner.

The speech used as learning data of the artificial neural network model applied to various embodiments of the disclosure may be a speech generated by the speaker exposed to a noisy environment. The speech generated in the noisy environment may reflect the Lombard effect. That is, according to an embodiment of the disclosure, the speech, which is any one of the pieces of learning data of the artificial neural network model, may be a Lombard effect-reflected speech generated in the noisy environment.

The artificial neural network model applied to various embodiments of the disclosure may use a tacotron based on the global style token which is a kind of end-to-end speech synthesis model.

Figure 11:
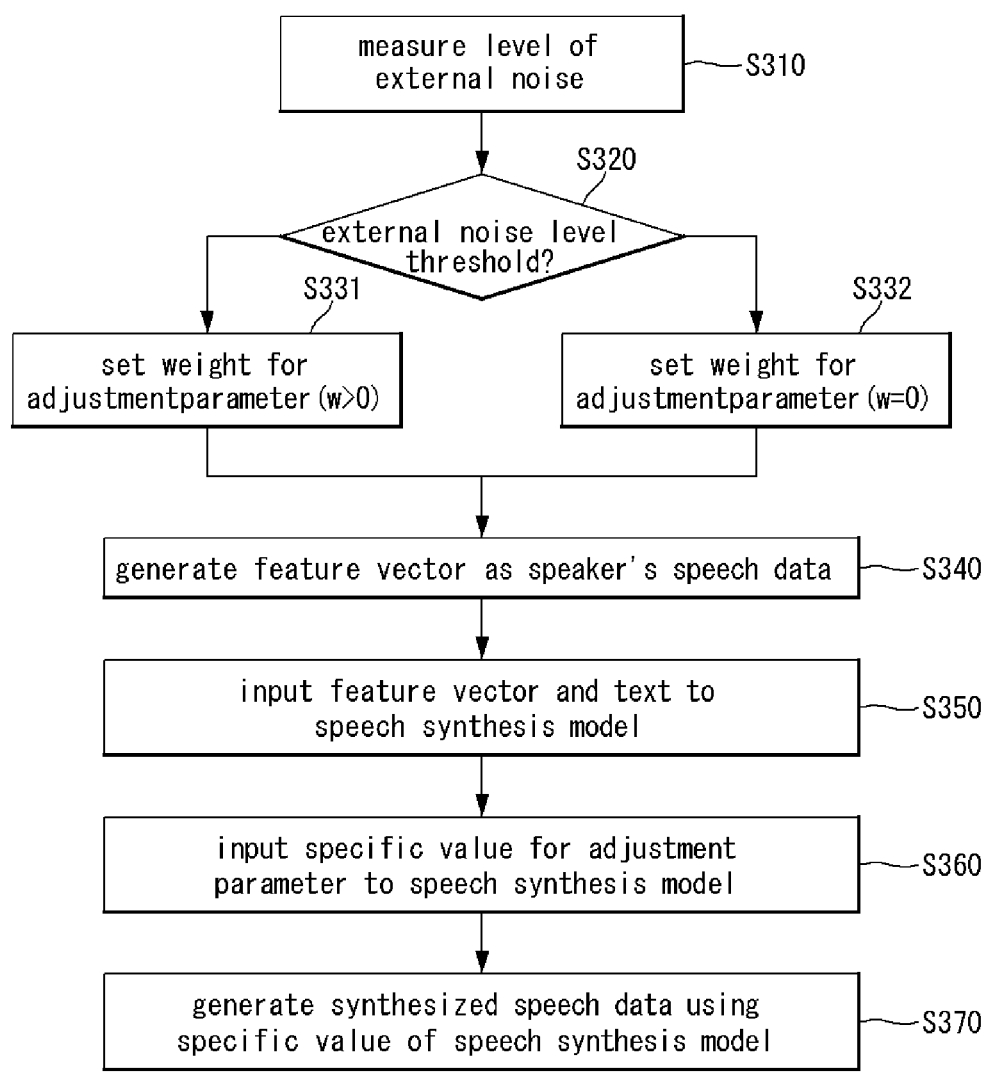
FIG. 11 is a flowchart illustrating a speech synthesis method according to an embodiment of the disclosure.

FIG. 11 is a flowchart illustrating a speech synthesis method according to an embodiment of the disclosure. Among the plurality of speech synthesis steps of FIG. 11, those overlapping FIG. 9 are not described, and the following description focuses primarily on differences.

The processor 140 may measure the level of external noise (S310).

The processor 140 may receive a speech signal generated in the surroundings of the external device 10 and measure the noise level from the received speech signal. As an example, the noise level may be set to range from 0 to 10.

If the level of external noise exceeds a preset threshold, the processor 140 may give an utterance style to the synthesized speech using the adjustment parameter (YES in S320 and S331). In contrast, unless the level of external noise exceeds the preset threshold, the processor 140 may set the weight for the adjustment parameter to 0 (NO in S320 and S332).

According to an embodiment of the disclosure, the processor 140 may determine the volume of the synthesized speech depending on the level of external noise. As an example, the processor 140 may determine the volume of the synthesized speech in proportion to the level of external noise. The threshold may be defined as the level of external noise when the volume of sound from the output device of the external device 10 reaches the upper limit. Or, the threshold may be a value preset by the user.

If the weight for the adjustment parameter is set to 0, the synthesized speech does not reflect the feature vector extracted from the utterance features and, resultantly, the Lombard effect does not apply to the synthesized speech. As the weight for the adjustment parameter is set to be closer to 1, a larger degree of Lombard style may be applied to the synthesized speech.

In a speech synthesis method according to a first embodiment of the disclosure, the processor 140 may set the weight for the adjustment parameter to increase in proportion to the measured external noise level.

In a speech synthesis method according to a second embodiment of the disclosure, upon receiving a speech signal including a wakeup word from the external device 10, the processor 140 may determine the distance between the user and the external device 10 from the speech signal and an image in the direction along which the speech signal has been received. The processor 140 may set the weight for the adjustment parameter to be adjusted depending on the determined distance. Preferably, the processor 140 may set the weight for adjustment parameter to increase in proportion to increases in the distance.

As an example, the processor 140 may further modify the weight for adjustment parameter, obtained according to the first embodiment, using the determined distance. As another example, the processor 140 may compute the weight using the determined distance alone, regardless of the level of external noise.

In a speech synthesis method according to a third embodiment of the disclosure, the processor 140 may set the weight for parameter to be adjusted depending on the distance between the user and the external device 10 and the external noise level that may be obtained according to the above-described first and second embodiments. In this case, the speech synthesis model may further include an artificial neural network-based learning model for computing the weight. The learning model for computing the weight may be designed to set a different weight for each of the external noise level and the distance between the user and the external device 10 and output a specific value for a target adjustment parameter.

According to an embodiment of the disclosure, the external device 10 may include at least one or more of robots, autonomous vehicles, XR devices, smartphones, or home appliances, and at least one or more, above-described, external devices 10 are connected to a cloud network. Here, an AI technology-applied robot, autonomous vehicle, XR device, smartphone, or home appliance may be referred to as an AI device or intelligent device 10.

The cloud network may mean a network which constitutes part of a cloud computing infrastructure or is present in a cloud computing infrastructure. The cloud network may be configured as a 3G network, 4G network, a long-term evolution (LTE) network, or 5G network.

The devices constituting the AI system may be connected together via the cloud network. The devices may communicate with one another via base stations or without relying on a base station.

The speech synthesis processing described below in connection with FIGS. 12 to 14 may be performed by at least one or more servers 60 or a 5G network, but not limited thereto or thereby. As an example, the functions that may be performed by at least one or more servers 60 or a 5G network may also be performed by a terminal (or user equipment (UE)) (e.g., 10 of FIG. 8). To that end, the terminal may include a plurality of processors.

Figure 12:
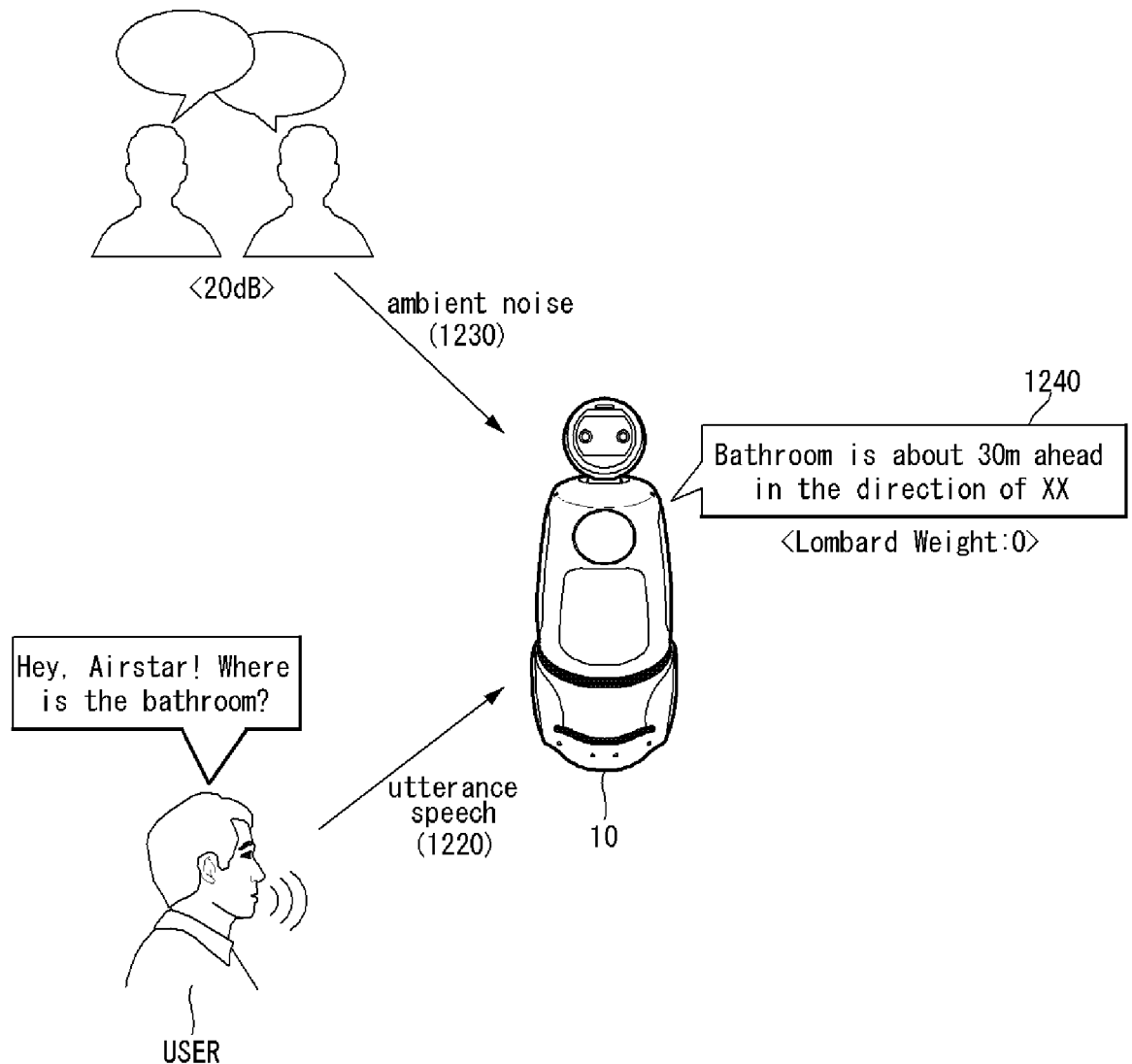
FIG. 12 is a view illustrating a first example of implementation of a speech synthesis method according to an embodiment of the disclosure.
Figure 13:
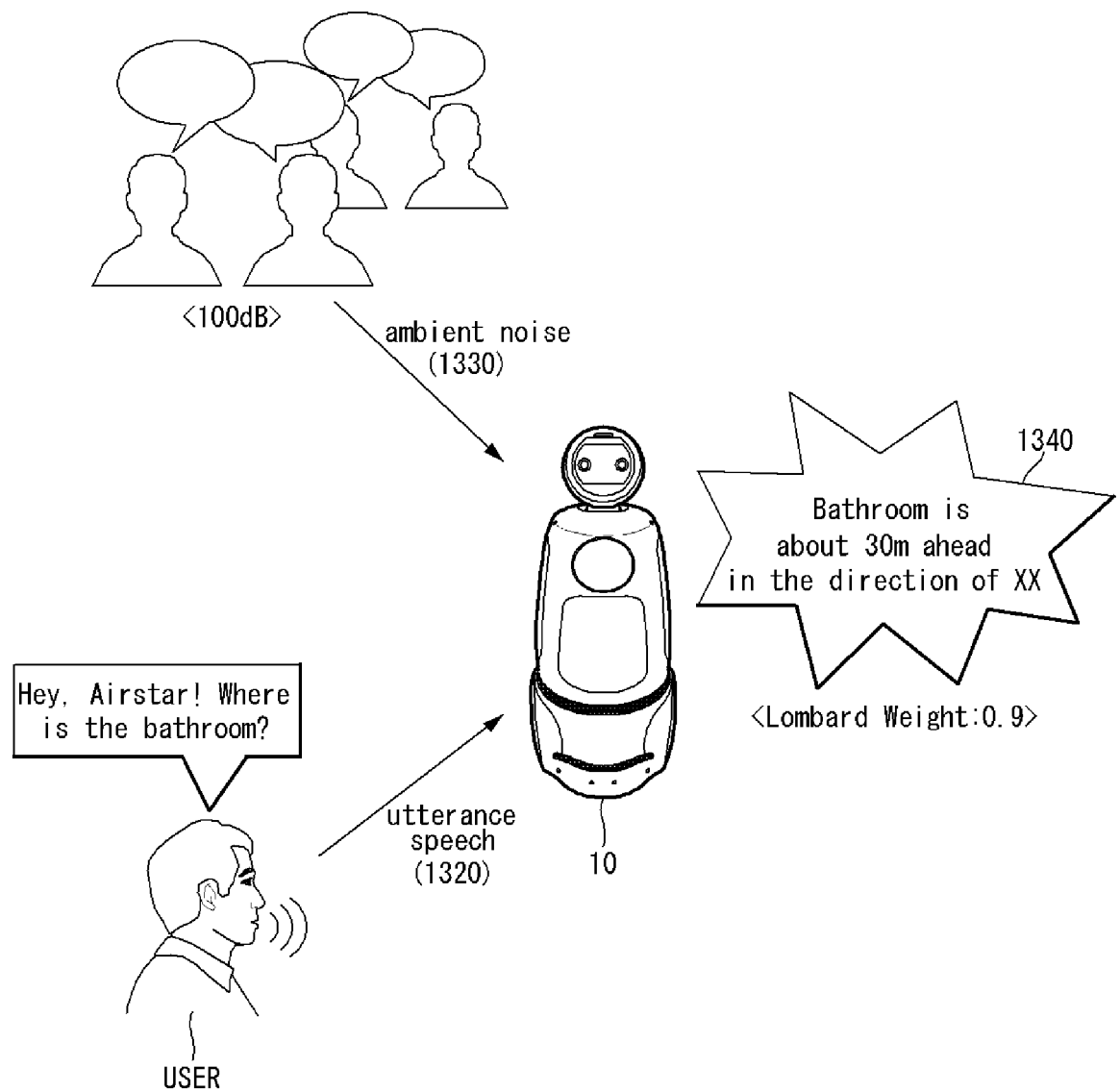
FIG. 13 is a view illustrating a second example of implementation of a speech synthesis method according to an embodiment of the disclosure.
Figure 14:
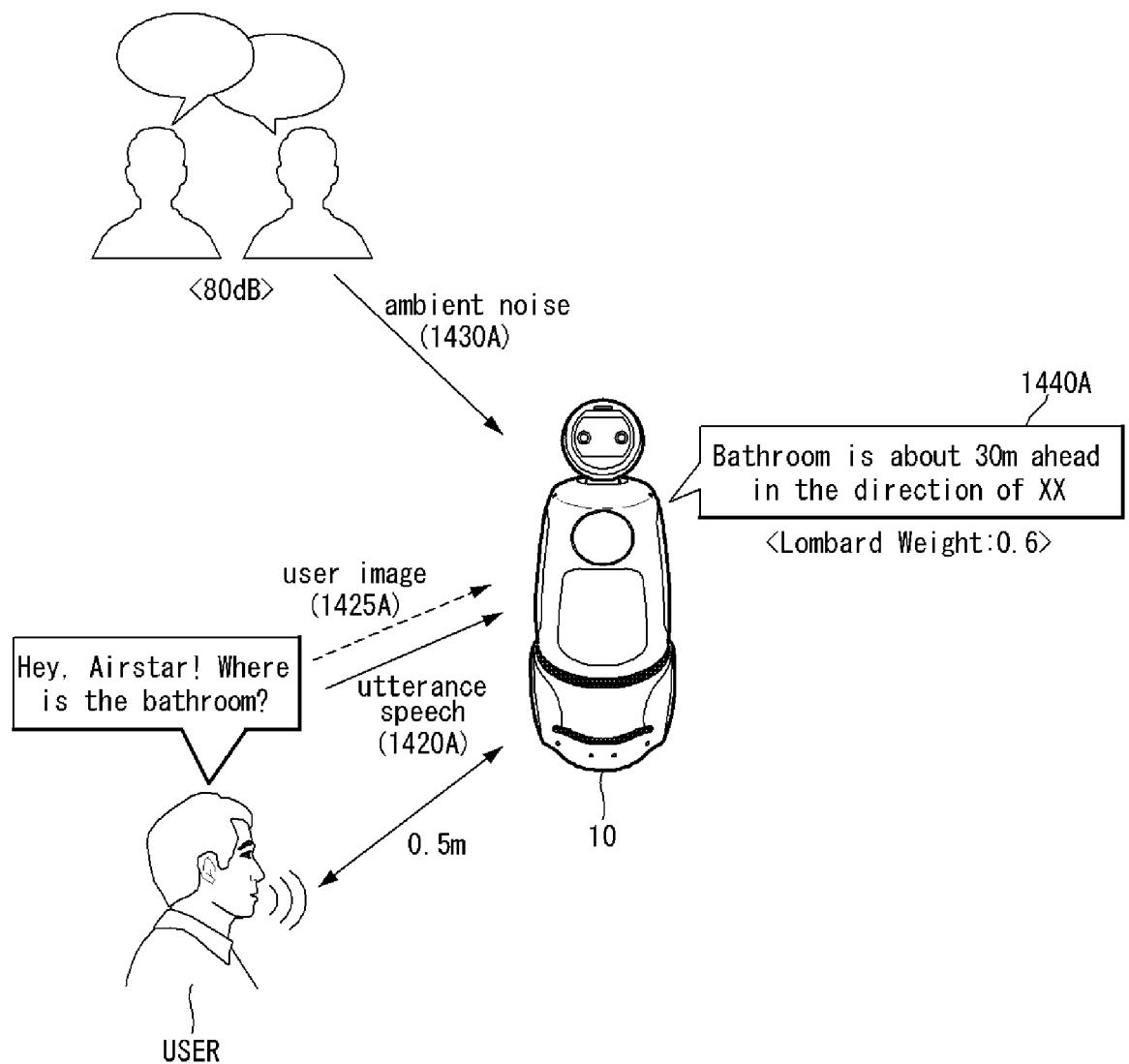
FIGS. 14 and 15 are views illustrating a third example of implementation of a speech synthesis method according to an embodiment of the disclosure.

Although FIGS. 12 to 14 do not explicitly show the server 60 or 5G network for speech synthesis processing, the AI device may communicate with the server 60 or 5G network to receive the AI processed information and output a synthesized speech 1240, 1340, 1440A, or 1440B or to receive the AI processed information via the AI module provided in the AI device and output the synthesized speech 1240, 1340, 1440A, or 1440B.

FIG. 12 is a view illustrating a first example of implementation of a speech synthesis method according to an embodiment of the disclosure.

Referring to FIG. 12, the intelligent device 10 may receive the user's speech signal 1220 and external noise 1230. As described above in connection with FIGS. 5 to 11, the intelligent device 10 may transmit the received speech signal 1220 and external noise 1230 to the server 60 or 5G network. Examples of implementation according to an embodiment of the disclosure are described below with reference to FIGS. 12 to 14, taking the server 60, of the server 60 or 5G network, as an example, but embodiments of the disclosure are not limited thereto.

Although the server 60 may perform AI processing in response to a wakeup word included in the received speech signal 1220, embodiments of the disclosure are not limited thereto. For example, the intelligent device 10 may also perform AI processing.

Specifically, as described above in connection with FIGS. 9 to 11, the server 60 may extract the feature vector of a specific speaker's speech data and input the extracted feature vector and text data to a speech synthesis model. The server 60 may input a specific value for an adjustment parameter for adjusting the utterance style of the synthesized speech 1240 to the speech synthesis model. The server 60 may generate speech synthesis data using the output value from the speech synthesis model.

As an example, the user transfers an utterance speech saying "Hey, Airstar! Let me know where the bathroom is" to the intelligent device 10. At this time, the intelligent device 10 may transmit the utterance speech to the server 60.

The server 60 may generate synthesized speech data regarding to a response to the received utterance speech. At this time, the ambient noise 1230 received via the intelligent device 20 measures 20 dB. 20 dB is as low as a ticking watch or rustling leaves and is a noise level at which the intelligent device 10 has no trouble in transferring a response to the user. The server 60 may generate synthesized speech data to which the Lombard effect does not apply and transfer the synthesized speech data to the intelligent device 10. That is, in such a case, the server 60 may set the weight of the adjustment parameter related to whether to apply the Lombard style to 0, and the Lombard style may be not applied.

As such, when the level of the ambient noise 1230 is less than a preset threshold, the server 60 does not apply the Lombard effect upon generating synthesized speech data, and the intelligent device 10 may control to allow the output volume to rise in proportion to the level of the ambient noise, thereby addressing the transmission failure due to the ambient noise 1230.

As a result, the intelligent device 10 may receive the synthesized speech data and output response information saying, "Bathroom is 30 m ahead in the direction of XX."

FIG. 13 is a view illustrating a second example of implementation of a speech synthesis method according to an embodiment of the disclosure.

Referring to FIG. 13, the intelligent device 10 may receive the user's speech signal 1320 and external noise 1330.

Specifically, as described above in connection with FIGS. 9 to 11, the server 60 may extract the feature vector of a specific speaker's speech data and input the extracted feature vector and text data to a speech synthesis model. The server 60 may input a specific value for an adjustment parameter for adjusting the utterance style of the synthesized speech 1340 to the speech synthesis model. The server 60 may generate speech synthesis data using the output value from the speech synthesis model.

As an example, the user transfers an utterance speech saying "Hey, Airstar! Let me know where the bathroom is" to the intelligent device 10. At this time, the intelligent device 10 may transmit the utterance speech to the server 60.

The server 60 may generate synthesized speech data regarding to a response to the received utterance speech. At this time, the ambient noise 1330 received via the intelligent device 10 measures 100 dB. 100 dB is a very high noise level, such as that of noise around an approaching train, at which the intelligent device 10 may have a trouble in transferring a response to the user. The server 60 may generate synthesized speech data to which the Lombard effect applies and transfer the synthesized speech data to the intelligent device 10. That is, in such a case, the server 60 may set the weight of the adjustment parameter related to whether to apply the Lombard style to a value (e.g., 0.9) close to 1, and the Lombard style may be significantly applied.

As such, when the level of the ambient noise 1330 exceeds the preset threshold, the server 60 applies the Lombard effect to the synthesized speech 1340 upon generating synthesized speech data, addressing the transmission failure due to the ambient noise 1330.

As a result, the intelligent device 10 may receive the synthesized speech data and output Lombard effect-applied, response information saying, "Bathroom is 30 m ahead in the direction of XX."

Figure 15:
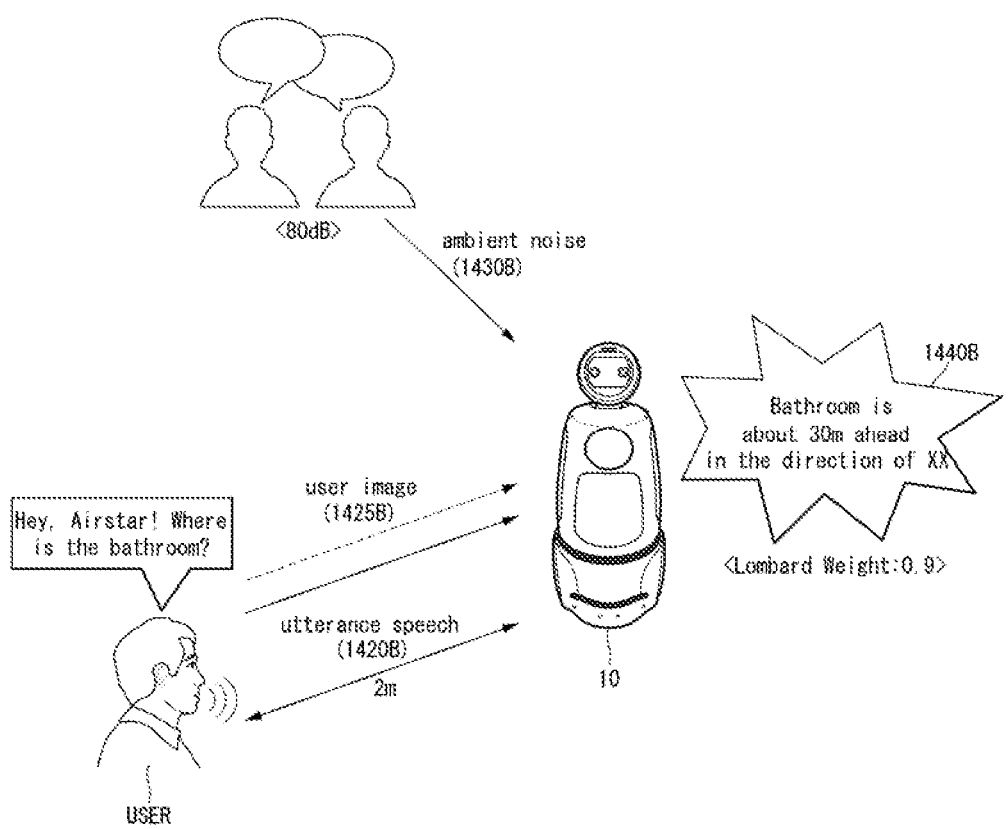

FIGS. 14 and 15 are views illustrating a third example of implementation of a speech synthesis method according to an embodiment of the disclosure.

Referring to FIGS. 14 and 15, the intelligent device 10 may receive the user's speech signal 1420 and external noise 1430.

Specifically, as described above in connection with FIGS. 9 to 11, the server 60 may extract the feature vector of a specific speaker's speech data and input the extracted feature vector and text data to a speech synthesis model. The server 60 may input a specific value for an adjustment parameter for adjusting the utterance style of the synthesized speech 1340 to the speech synthesis model. The server 60 may generate speech synthesis data using the output value from the speech synthesis model.

As an example, the user transfers an utterance speech saying "Hey, Airstar! Let me know where the bathroom is" to the intelligent device 10. At this time, the intelligent device 10 may transmit the utterance speech to the server 60.

The server 60 may generate synthesized speech data regarding to a response to the received utterance speech. At this time, the ambient noise 1430 received via the intelligent device 10 measures 80 dB. 80 dB is an intermediate noise level, such as that of noise inside a subway train, at which the intelligent device 10 may have a slight trouble in transferring a response to the user. The server 60 may generate synthesized speech data to which the Lombard effect applies and transfer the synthesized speech data to the intelligent device 10.

That is, in such a case, the server 60 may set the weight of the adjustment parameter related to whether to apply the Lombard style to an intermediate level (e.g., 0.6), and the Lombard style may be applied at an intermediate level.

As such, when the level of the ambient noise 1430 exceeds the preset threshold, the server 60 applies the Lombard effect to the synthesized speech 1440A or 1440B upon generating synthesized speech data, addressing the transmission failure due to the ambient noise 1430.

As a result, the intelligent device 10 may receive the synthesized speech data and output Lombard effect-applied, response information saying, "Bathroom is 30 m ahead in the direction of XX." However, whether to apply the Lombard style may be determined by other factors as well as external noise. Described below is an example of implementation of a speech synthesis method according to a third embodiment of the disclosure.

In a speech synthesis method according to the third embodiment of the disclosure, the server 60 may adjust the weight of adjustment parameter depending on the distance between the intelligent device 10 and the user (USER).

Specifically, the server 60 may receive the user's speech signal 1420 and an image in the direction along which the speech signal 1420 has been received from the external device 10.

The server 60 may determine the distance between the user USER and the intelligent device 10 from the speech signal 1420 and the image in the direction along which the speech signal 1420 has been received. In this case, the image may include metadata related to the distance to the user USER included in the image. In other words, the server 60 may predict and/or determine the distance to the user USER included in the image by analyzing the image.

The server 60 may increase the weight for adjustment parameter in proportion to the determined distance.

FIG. 14 illustrates that the distance between the user USER and the intelligent device 10 is 0.5 m, and FIG. 15 illustrates that the distance between the user USER and the intelligent device 10 is 2 m. Although a high volume of sound is output from the intelligent device 10, if the distance between the user USER and the intelligent device 10 is large, transmission of response information by the intelligent device 10 may be troubled even with a lower level of ambient noise 1430.

Thus, in the case of FIG. 14, the server 60 may set the weight of adjustment parameter to 0.6 and output the synthesized speech 1440A with the Lombard effect applied at an intermediate level and, in the case of FIG. 15, the server 60 may set the weight of adjustment parameter to 0.9 and apply a higher level of Lombard effect to the synthesized speech 1440B.

In the Lombard effect, the speaker actively varies the pitch or inflection of voice tone to overcome ambient noise. Generally, recorded speech data sets are gathered in a quiet environment and thus do not exhibit the Lombard effect. In other words, learning data of a deep learning model applied to various embodiments of the disclosure may include Lombard effect-reflected data sets, and the trained deep learning model may be used to output Lombard effect-reflected speech synthesis results.

The above-described embodiments of the disclosure may be implemented in code that a computer may read out of a recording medium. The computer-readable recording medium includes all types of recording devices storing data readable by a computer system. Examples of the computer-readable recording medium include hard disk drives (HDDs), solid state disks (SSDs), silicon disk drives (SDDs), read-only memories (ROMs), random access memories (RAMs), CD-ROMs, magnetic tapes, floppy disks, or optical data storage devices, or carrier wave-type implementations (e.g., transmissions over the Internet). Thus, the above description should be interpreted not as limiting in all aspects but as exemplary. The scope of the disclosure should be determined by reasonable interpretations of the appended claims and all equivalents of the disclosure belong to the scope of the disclosure.

What is claimed is:

1. A method of speech synthesis, the method comprising:
obtaining speech data from a speaker;
measuring a level of external noise;
extracting an utterance feature from the speech data;
generating a feature vector representing the utterance feature;
applying the feature vector, text data, and at least one parameter for controlling speech synthesis to a pre-trained speech synthesis model including a text-to-speech synthesis model; and
generating synthesized speech data using an output value from the pre-trained speech synthesis model, wherein the at least one parameter includes a parameter for adjusting a level of applying a lombard effect to the synthesized speech data using the parameter based on the level of the external noise exceeding a preset threshold.

2. The method of claim 1, wherein the pre-trained speech synthesis model includes an artificial neural network model trained using a plurality of pieces of learning text and a learning speech corresponding to the plurality of pieces of learning text, and wherein the learning speech includes a speech generated in a noisy environment and reflecting the lombard effect.

3. The method of claim 1, wherein generating the feature vector includes extracting the utterance feature by applying the speech data to a pre-trained unsupervised learning model.

4. The method of claim 1, further comprising:
when the level of external noise is less than the preset threshold, setting a weight for the parameter to 0.

5. The method of claim 1, wherein the preset threshold is a level of the external noise corresponding to a maximum volume of an external device.

6. The method of claim 1, further comprising:
setting a weight for the at least one parameter to increase in proportion to the level of external noise.

7. The method of claim 1, wherein the pre-trained speech synthesis model includes a recurrent neural network (RNN)-based artificial neural network model.

8. The method of claim 1, wherein the feature vector is extracted from the utterance feature including at least one of an utterance speed of the speaker, pronunciation, accent, idle period, tone, base frequency, vowel utterance duration, harmonic-to-noise ratio (HNR), or inflection included in the speech data.

9. The method of claim 1, wherein the pre-trained speech synthesis model includes an artificial neural network model trained in an end-to-end manner.

10. The method of claim 1, further comprising:
receiving speech signal of a user and an image in a direction along which the speech signal has been received from an external device;
determining a distance between the user and the external device from the speech signal and the image in the direction along which the speech signal has been received; and
setting a weight for the parameter to increase in proportion to the distance.

11. A speech synthesis device, comprising:
a memory;
a transceiver communicating with an external server; and
a processor configured to:
obtain speech data from a speaker,
measure a level of external noise,
extract an utterance feature from the speech data,
generate a feature vector representing the utterance feature,
apply the feature vector, text data, and at least one parameter for controlling speech synthesis to a pre-trained speech synthesis model, and
generate synthesized speech data using an output value from the pre-trained speech synthesis model, wherein the at least one parameter includes a parameter for adjusting a level of applying a lombard effect to the synthesized speech data using the parameter based on the level of the external noise exceeding a preset threshold.

12. The speech synthesis device of claim 11, wherein the pre-trained speech synthesis model includes an artificial neural network model trained using a plurality of pieces of learning text and a learning speech corresponding to the plurality of pieces of learning text, and wherein the learning speech includes a speech generated in a noisy environment and reflecting the lombard effect.

13. The speech synthesis device of claim 11, wherein the processor is further configured to extract the utterance feature by applying the speech data to a pre-trained unsupervised learning model.

14. The speech synthesis device of claim 11, wherein the processor is further configured to set a weight for the parameter to 0 when the level of external noise is less than the preset threshold.

15. The speech synthesis device of claim 11, wherein the preset threshold is a level of the external noise corresponding to a maximum volume of an external device.

16. The speech synthesis device of claim 11, wherein the processor is further configured to set a weight for the at least one parameter to increase in proportion to the level of external noise.

17. The speech synthesis device of claim 11, wherein the pre-trained speech synthesis model includes a recurrent neural network (RNN)-based artificial neural network model.

18. The speech synthesis device of claim 11, wherein the feature vector is extracted from the utterance feature including at least one of an utterance speed of the speaker, pronunciation, accent, idle period, tone, base frequency, vowel utterance duration, harmonic-to-noise ratio (HNR), or inflection included in the speech data.

* * * * *